United States Patent [19]
Dyble et al.

[11] Patent Number: 5,597,433
[45] Date of Patent: Jan. 28, 1997

[54] METHOD AND APPARATUS FOR MANUFACTURING PLASTIC CANISTERS

[75] Inventors: Bertie J. Dyble, Janesville; Robert W. Dyson, deceased, late of Janesville, by Richard Holznecht, administrator; William C. Foss, Janesville, all of Wis.

[73] Assignee: Panoramic, Inc., Janesville, Wis.

[21] Appl. No.: 250,525

[22] Filed: May 27, 1994

[51] Int. Cl.$^6$ ........................................ B32B 31/00
[52] U.S. Cl. .................. 156/203; 156/218; 156/443; 156/481; 156/580.1; 493/269
[58] Field of Search ................ 156/203, 215, 156/217, 218, 86, 73.1, 380.1, 477.1, 481, 580, 580.1, 443; 493/466, 269; 53/586

[56] References Cited

U.S. PATENT DOCUMENTS

| | | | |
|---|---|---|---|
| 1,774,386 | 8/1930 | Lard | 493/269 X |
| 2,063,013 | 12/1936 | Cooper . | |
| 2,917,217 | 12/1959 | Sisson . | |
| 3,346,435 | 10/1967 | Beck . | |
| 3,654,037 | 4/1972 | Lieblang . | |
| 3,872,994 | 3/1973 | Hyde . | |
| 4,041,848 | 8/1977 | Richards . | |
| 4,053,346 | 10/1977 | Amberg et al. . | |
| 4,065,023 | 12/1977 | Rentmeester et al. | 156/218 X |
| 4,072,549 | 2/1978 | Amberg et al. . | |
| 4,187,768 | 2/1980 | Suzuki . | |
| 4,256,028 | 3/1981 | Amberg . | |
| 4,295,838 | 10/1981 | Richards et al. . | |
| 4,303,032 | 12/1981 | Takahashi et al. | 156/203 X |
| 4,334,875 | 6/1982 | Eckert . | |
| 4,349,400 | 9/1982 | Gilden . | |
| 4,357,186 | 11/1982 | Calvert | 156/580.1 X |
| 4,540,392 | 9/1985 | Junod et al. . | |
| 4,559,765 | 12/1985 | Cress et al. . | |
| 4,581,003 | 4/1986 | Ito et al. . | |
| 4,604,307 | 8/1986 | Spreeuwers . | |
| 4,713,048 | 12/1987 | Reil et al. | 493/466 X |
| 5,135,462 | 8/1992 | Stahlecker et al. . | |

*Primary Examiner*—James Engel
*Attorney, Agent, or Firm*—Foley & Lardner

[57] ABSTRACT

The present invention is directed towards a method and apparatus for making clear plastic canisters, in which the canisters retain the full clarity of the clear plastic canister sidewall stock and base stock while they are being processed into canisters, the plastic sidewall stock and the base stock may be pre-labeled before being processed into canisters without any subsequent distortion of the label during such processing, and the apparatus and method can be modified to accept differently-sized canister component stock with minimal equipment modification and downtime. These objectives are fulfilled by an invention wherein the plastic sidewall stock is bent into a "U" and its unbent side edges are held in a fixed reference position, support means are inserted within the curvature of the "U", clamping means push the unbent side edges to the surface of the support means in overlapping fashion, tube welding means weld the overlapping side edges together to form a seam, the completed tube is placed on a canister base with the canister base in close relation to the bottom edge of the tube, and the canister base is then welded to the tube to complete the canister. The need for equipment modification in the event of changes in the size of the canister component stock is minimized in that the apparatus either self-adapts to differently-sized stock or uses parts which may be quickly changed to accommodate such stock. Further, since only the welded seam areas of the canister stock have forces of any great magnitude acting on them, the clarity of the canister component stock and any labeling on the canister component stock are preserved when the canister is formed.

38 Claims, 28 Drawing Sheets

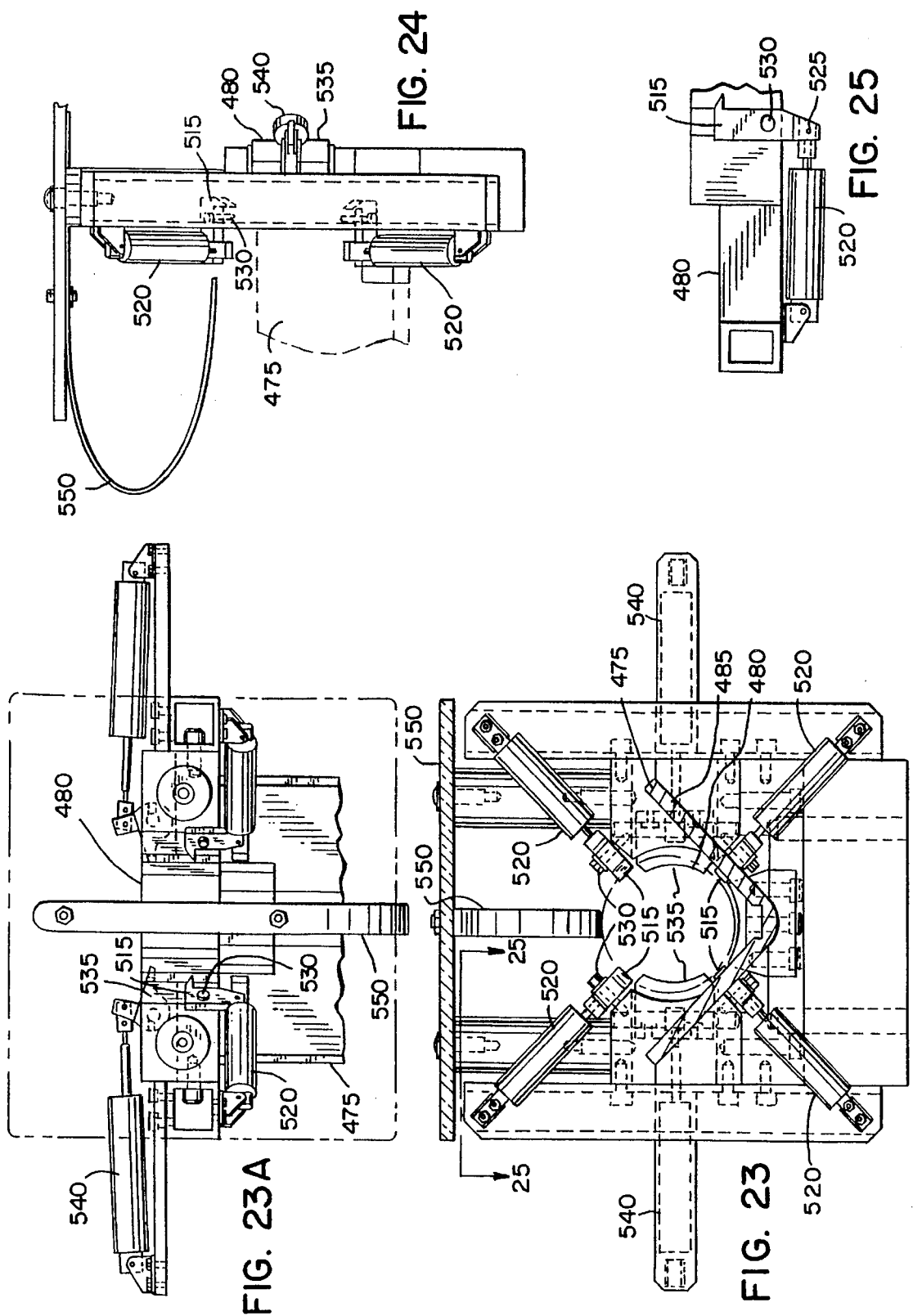

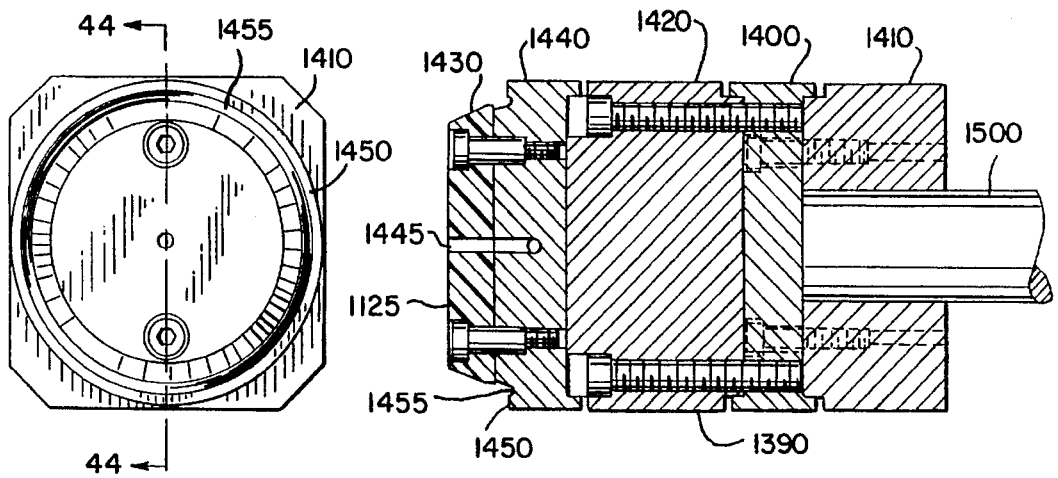
FIG. 43
FIG. 44
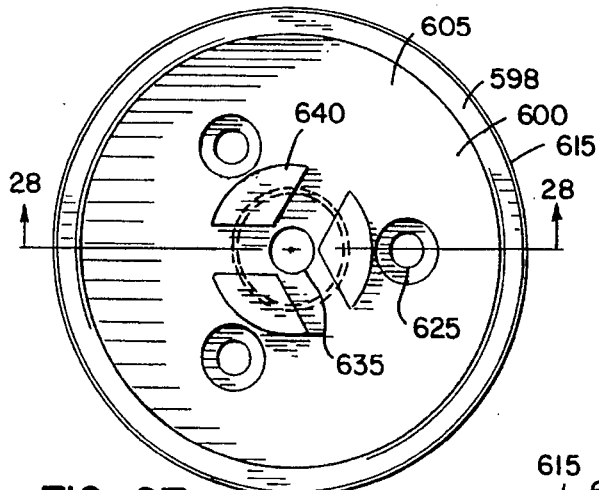
FIG. 27
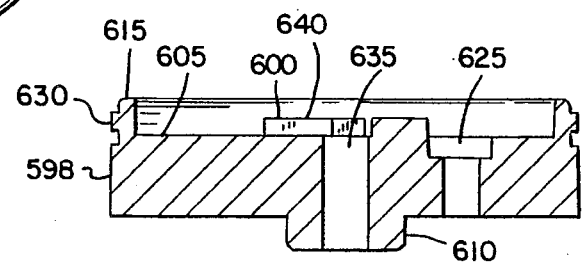
FIG. 28
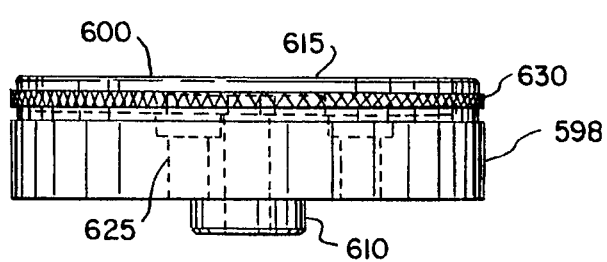
FIG. 29

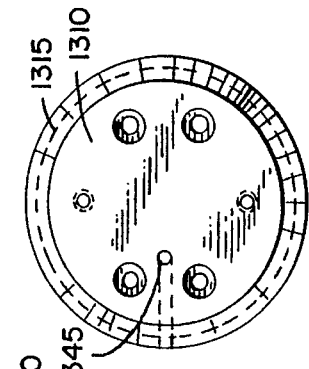
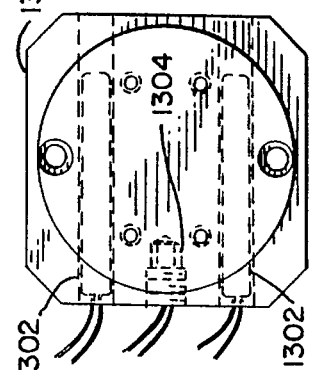
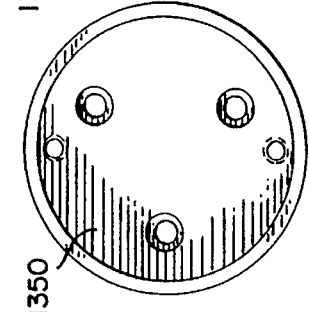
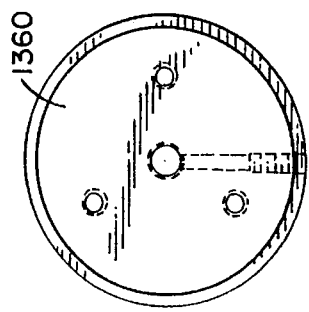
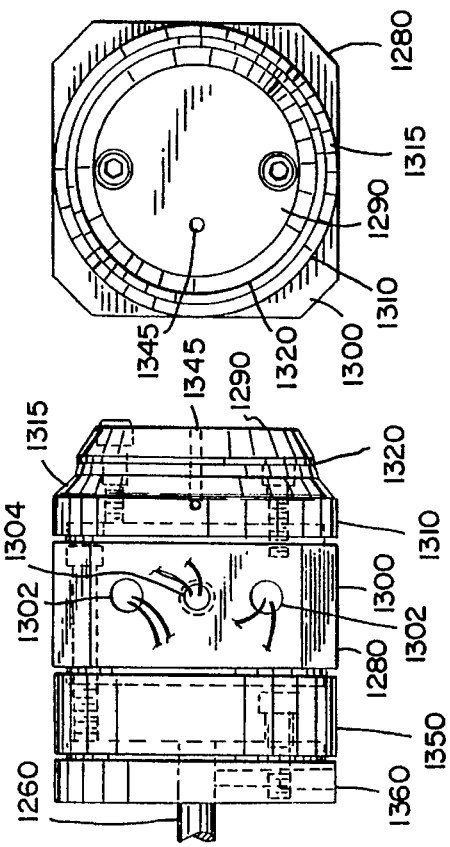
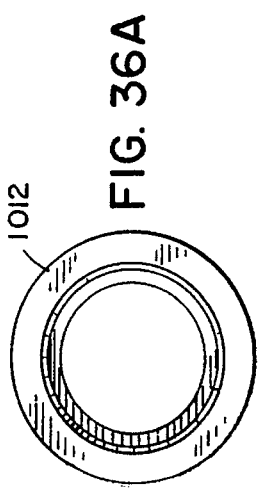
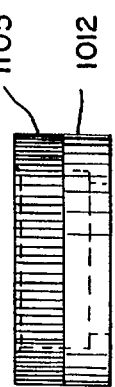

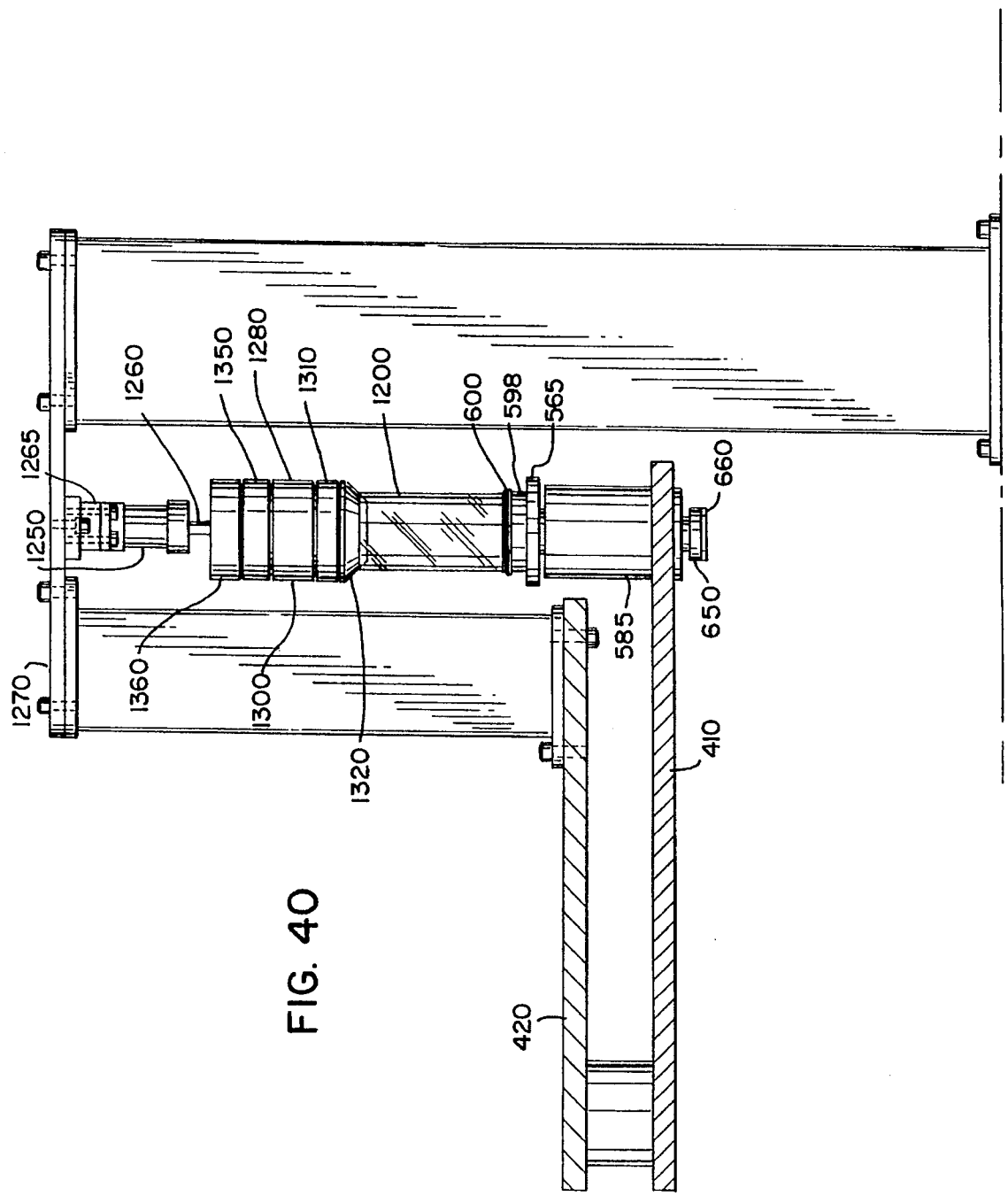

METHOD AND APPARATUS FOR MANUFACTURING PLASTIC CANISTERS

FIELD OF THE INVENTION

This invention relates generally to the field of the manufacturing of canisters, and more specifically to forming canisters from thermoplastic blanks.

BACKGROUND OF THE INVENTION

While rigid clear plastic canisters have existed in the art of materials packaging for some time, several difficulties with their production and use still exist.

A first problem lies in preserving the clarity of the canister. While clear plastic canisters are easily and rapidly produced by commonly known blow molding and extrusion techniques, the sidewalls tend to have flow marks and irregularities in thickness which distort or obscure the view of the materials inside. Such distortion is undesirable because the packaging is often intended to enhance the appearance of the product inside, and hence increase its desirability to consumers.

A second problem lies in labeling the canister. It is frequently desirable that the canister be labeled before it is filled with product so that the processing of the packaged product is fully completed once the canister is filled. Several advantages are realized by filling a pre-labeled canister: no additional steps in packaging are needed once the canister is filled, and the packaged product can go directly into the market place; the labeled canisters used for packaging can be pre-prepared at different locations and shipped with lower weight, and thus lower shipping costs; and mislabeled or defective canisters can be detected at a stage of processing where the costs of correction are lower. Unfortunately, there is no effective way to pre-print the component stock for blow molded or extruded canisters so that the canister emerges from the blow molding or extrusion process with a label on it. These methods mechanically deform the plastic component stock to form the canister. Canisters produced by methods such as heat-shrinking the thermoplastic component stock to form a canister (e.g., as shown in U.S. Pat. Nos. 4,053,346, 4,072,549, and 4,559,765), cannot be pre-labeled either, due to problems with distortion of the stock. However, there can be difficulties with the application of a label even after the canister is formed.

If the labeling is to be added by embossing, impressing, printing, or painting the sidewalls of the finished canister rather than using a sticker, the process becomes difficult and expensive due to the curved (and possibly nonrigid) work surface that the canister sidewalls provide. A rounded, flexible work surface is difficult to support during the labeling process without the use of complex machinery. It is also difficult to devise a process which will apply the label at the same position on the sidewalls or the canister bases of all the canisters. This is a particularly important consideration where a multicolored label is to be printed on the canisters; in such a case, when the colors are printed on the canister one by one, each color pattern must be precisely aligned with the color pattern applied by the previous printing step or a distorted label will result. These same considerations apply to canisters which are produced by methods other than blow-molding and extruding.

Another problem lies in devising a manufacturing process which can be quickly and easily adapted to produce canisters of different height and diameter as the need requires. Blow molded and extruded canisters need different molds and dies if the canister size is to be changed, and changing these parts may require an extensive shutdown of the manufacturing process while the new parts are installed. Other manufacturing methods generally involve wrapping a sidewall blank about a mandrel and a canister base and welding the seams (e.g., as shown in U.S. Pat. Nos. 4,041,848, 4,360,838, 4,334,875, 4,349,575, 4,745,535, and 5,135,462). These methods are often unsatisfactory; besides being generally directed towards thermoplastic-coated cardboard materials, they require a change in numerous parts in the manufacturing apparatus if the canister size is to be changed, and therefore they too require substantial time to change over.

SUMMARY OF THE INVENTION

The present invention is directed towards an apparatus and method for making clear plastic canisters, in which the canisters retain the full clarity of the clear plastic sidewall blank stock and canister base stock during processing. The plastic sidewall blank stock for the canister sidewall and the canister bases may be pre-labeled before its formation into canisters without any subsequent distortion of the labeling during processing. Further, the time required to reconfigure the apparatus so that the height and diameter of the canisters may be changed is minimized.

In accordance with the invention, the canister is formed in two stages. The first stage forms a tube for the sidewall of the canister, and the second stage attaches a canister base on this tube to form the completed canister. The first stage uses (preferably) clear pre-cut rectangular thermoplastic sidewall blanks as the stock for making tubes. The blanks are preferably semi-rigid and can be resiliently bent. A sidewall blank is first formed into a "U" shape by supporting it at opposite side edges and pressing the center of the blank downwardly with a ram, with the face of the sidewall blank that is to be the outer face of the tube (and canister) at the outside of the "U", and the face of the sidewall blank that is to be the inner face of the tube (and canister) on the inside of the "U". The top and bottom ends of the sidewall blank, which will comprise the top and bottom of the tube, are bent by the ram when it descends into the flat blank to bend the sidewall blank into the "U", while the side edges of the sidewall blank are left undeformed. Holding means, which may accommodate sidewall blanks of different size, hold the sidewall blank in the U-shape so that the side edges of the sidewall blank rest in a standard reference position. Whatever the size of the sidewall blank (and thus the size or curvature of the "U"), the side edges preferably always rest in this reference position. The U-shaped sidewall blank is then advanced so that a welding support mandrel forming a support means extends within the curve of the blank between the sidewalls. Clamping jaws then push the side edges of the sidewall blank onto the surface of the support means with one side edge overlapping the other, thereby allowing the resilient sidewall blank to assume a tubular configuration. A welder descends into contact with the overlapping side edges to join them together at a seam, forming the sidewall blank into a tube. The completed tube is then ejected axially from the support means, and is now ready to enter the second stage for the addition of a base.

The second stage uses clear pre-formed canister bases formed of thermoplastic disks with a depending skirt located at the periphery of the disks. The canister bases and tubes are loaded onto forming supports upon which operations are performed on the canister base and tube to join them. Each forming support is preferably a raised surface with a circular periphery of such size that a canister base may fit atop the forming support with its skirt overhanging the periphery of the surface in close relation to the periphery. A canister base feeding apparatus supplies the successive canister bases to a canister base placement unit, which takes a single canister base and places it on a forming support. A tube supply unit carries the formed tubes to a tube placement unit which places each tube atop a canister base on a forming support so that the canister base rests within the inner cavity of the tube with the skirt in close relation to the bottom edge of the tube. A welder then welds the bottom edge of the tube to the skirt, completing the canister. The forming supports are preferably formed on fixtures mounted to a rotary table which can be indexed to bring the bases and tubes together and carry out the various forming operations at stations around the table. If the diameter of the canister is to be changed, forming supports of appropriate size may be substituted for the original forming supports to match the size of the canister bases. A forming tool may be used to add a lip to the top edge of the canister, if desired, and thereafter the canister is removed from the forming support.

The canisters formed in accordance with the invention thus retain the full clarity of the component stock. There are no flow marks or irregularities in plastic thickness of the type commonly seen in containers formed by extrusion or blow molding. Because the clear plastic sidewall blanks are formed into a tube and welded at the side and bottom edges, any variations in the clarity of the tube sidewalls (apart from the welded seam) are due to pre-existing variations in the clarity of the plastic sidewall blank stock, which generally will be uniformly clear. The preformed canister bases are similarly unaffected by the formation of the canister, and only the welded seam areas suffer any forces during processing that affect the clarity of the plastic. Provided that sidewall blank stock of sufficient clarity is used, the product packaged within a canister may be displayed without any distortion or obstruction of its appearance.

The flat canister blank stock may be labeled by embossing, impressing, stenciling, printing, or other means before it is formed into tubes, and such labelling will not be damaged by the subsequent canister-forming process. No welding energies or forces of sufficient magnitude to damage the labeling are exerted on the sidewalls or the canister base apart from the seam areas, so no distortion or damage to the labeling occurs as the canisters are made. Since the plastic blank stack does not elongate, shrink, or change its thickness at any time during the formation of the canister, the labeling remains intact and undistorted throughout the entire canister forming process.

Changes in canister size may be accommodated with relatively few changes in the apparatus. A change in canister component size is either irrelevant to the canister-forming process or may be accommodated by the replacement of a few parts which can be adapted for quick replacement. The first stage, the formation of the tube, self-adapts to differently-sized plastic sidewall stock. Since the holding means holds the side edges of each successive sidewall blank in the same place immediately before the clamping jaws form the tube by pressing the side edges to the support mandrel, and because the support mandrel need only support the area on the tube that is to be welded rather than supporting the entire circumference of the tube, the size of the sidewall blank is largely immaterial. The primary limitations on the sidewall blank size is that it cannot be too small to be bent into a U-shape or to have the support mandrel inserted within it, and it cannot be so large that it cannot fit within the apparatus or that the welding means cannot weld an entire seam. The resiliency of the blank causes it to assume a cylindrical shape after the seam is welded and the tube is released.

The second stage, the welding of the canister base onto the tube, may require that certain parts (such as the forming support) be replaced with parts of different size if the canister diameter is to be changed, but changeover time is minimized by adapting these parts for rapid replacement. Changes in canister height may be accommodated by elevating or lowering certain parts of the apparatus, or by adjusting the range of motion of certain parts. A change in canister size is thus rapidly accommodated so that minimal time for equipment modification is needed for changeover.

While the invention is ideally intended for use in the manufacture of clear plastic canisters, the method and apparatus disclosed herein can be used to manufacture canisters made of other non-transparent materials, such as thermoplastic-coated paperboard or metallic foil.

Further objects, features, and advantages of the invention will be apparent from the following detailed description when taken in conjunction with the accompanying drawings.

BRIEF DESCRIPTION OF THE DRAWINGS

In the drawings:

FIG. 23 is an front elevation view of the channel escapement mechanism of the canister base feeding magazine as viewed from the channel foot.

FIG. 23A is a plan view of the channel escapement mechanism.

FIG. 24 is a side elevation view of the channel escapement mechanism of FIG. 23.

FIG 25 is a detailed side view of the stack finger of the mechanism of FIG. 23.

FIG. 27 is a top plan view of the forming support on the head of the forming station fixture of FIG. 26.

FIG. 28 is a cross-sectional view of the forming support taken along the line 28—28 of FIG. 27.

FIG. 29 is a side elevation view of the forming support.

FIG. 36A is a bottom plan view of the knurled contact roller of the welding station.

FIG. 36B is an elevation view of the knurled contact roller.

FIG. 40 is a side elevation view of one of the first two lip-forming stations.

FIG. 41 is an elevation view of the heated plunger used at the first two lip forming stations.

FIG. 42 is a plan view of the bottom face of the heated plunger used at the first two lip forming stations.

FIG. 42A is a plan view of the first heating layer of the heated plunger used at the first two lip-forming stations.

FIG. 42B is a plan view of the first finishing layer of the heated plunger used at the first two lip-forming stations.

FIG. 42C is a plan view of the first tail insulating layer of the heated plunger used at the first two lip-forming stations.

FIG. 42D is a plan view of the first tail layer of the heated plunger used at the first two lip-forming stations.

FIG. 43 is a plan view of the bottom face of the heated plunger used at the last three lip forming stations.

FIG. 44 is a cross-sectional view of the heated plunger used at the last three lip forming stations taken generally along the lines 44—44 of FIG. 43.

DETAILED DESCRIPTION OF THE INVENTION

The apparatus of the present invention forms canisters having a cylindrical wall and a closed bottom end, so that the canisters so formed are ready to be filled. The apparatus of the invention can carry out the forming of the canisters in two stages. In the first stage, a tube is formed by providing a sidewall blank, deforming it into a cylindrical shape, and then joining overlapped edges of the sidewall. Aspects of this first stage are illustrated in FIGS. 1–18. In the second stage, a canister base is joined to the tube to complete the canister. The top edge of the tube is also preferably shaped to reinforce and add rigidity to the structure of the canister and adapt it to have a cover placed thereon. This second stage is illustrated in FIGS. 19–46. Both the first and second stages are sequentially controlled by an appropriate automatic controller (e.g., an Allen-Bradley SLC-500 Programmable Controller) as discussed further below.

Figure 1:
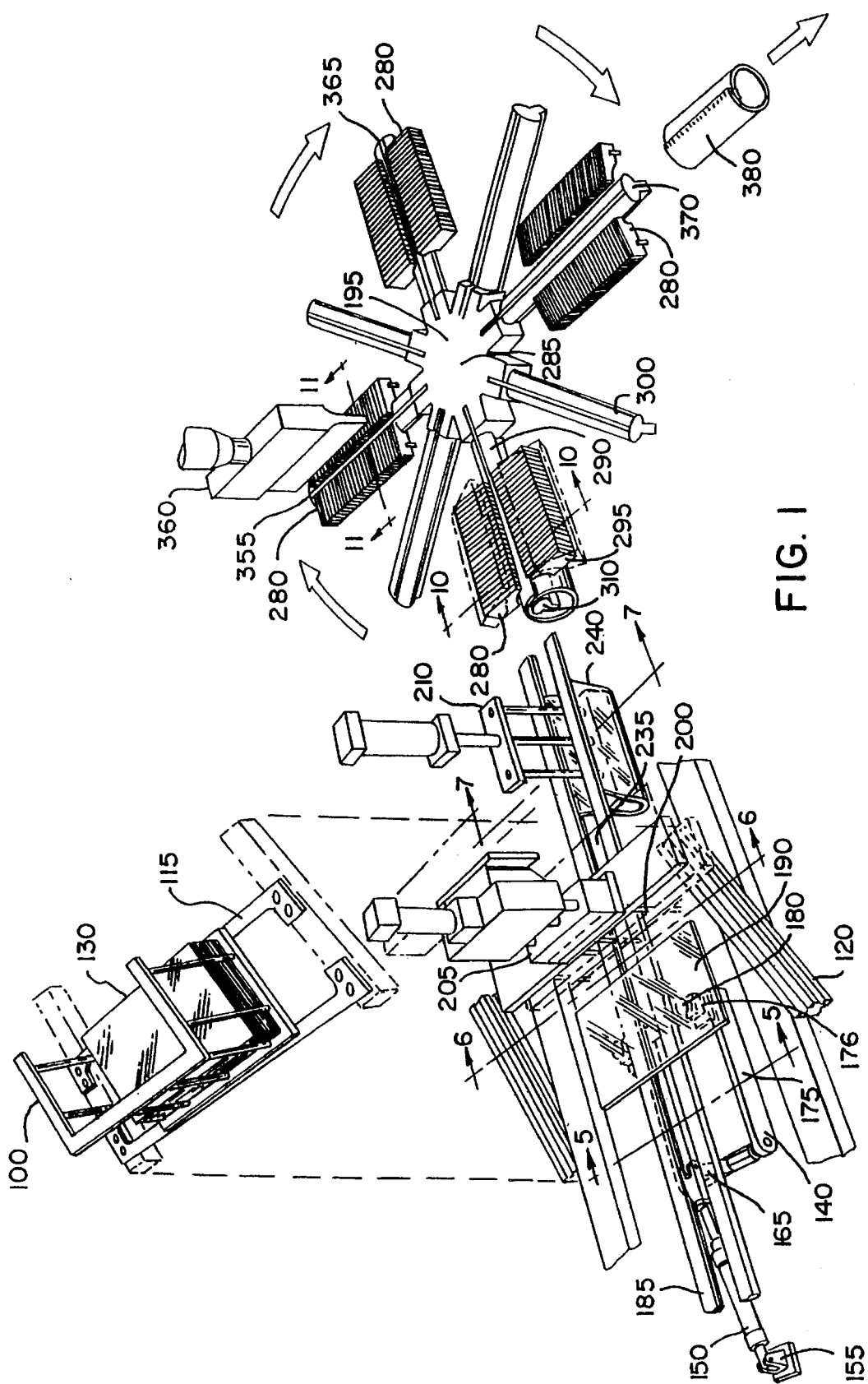
FIG. 1 is a simplified perspective view of the first stage apparatus of the invention carrying out the formation of canister tubes in accordance with the invention.
Figure 3:
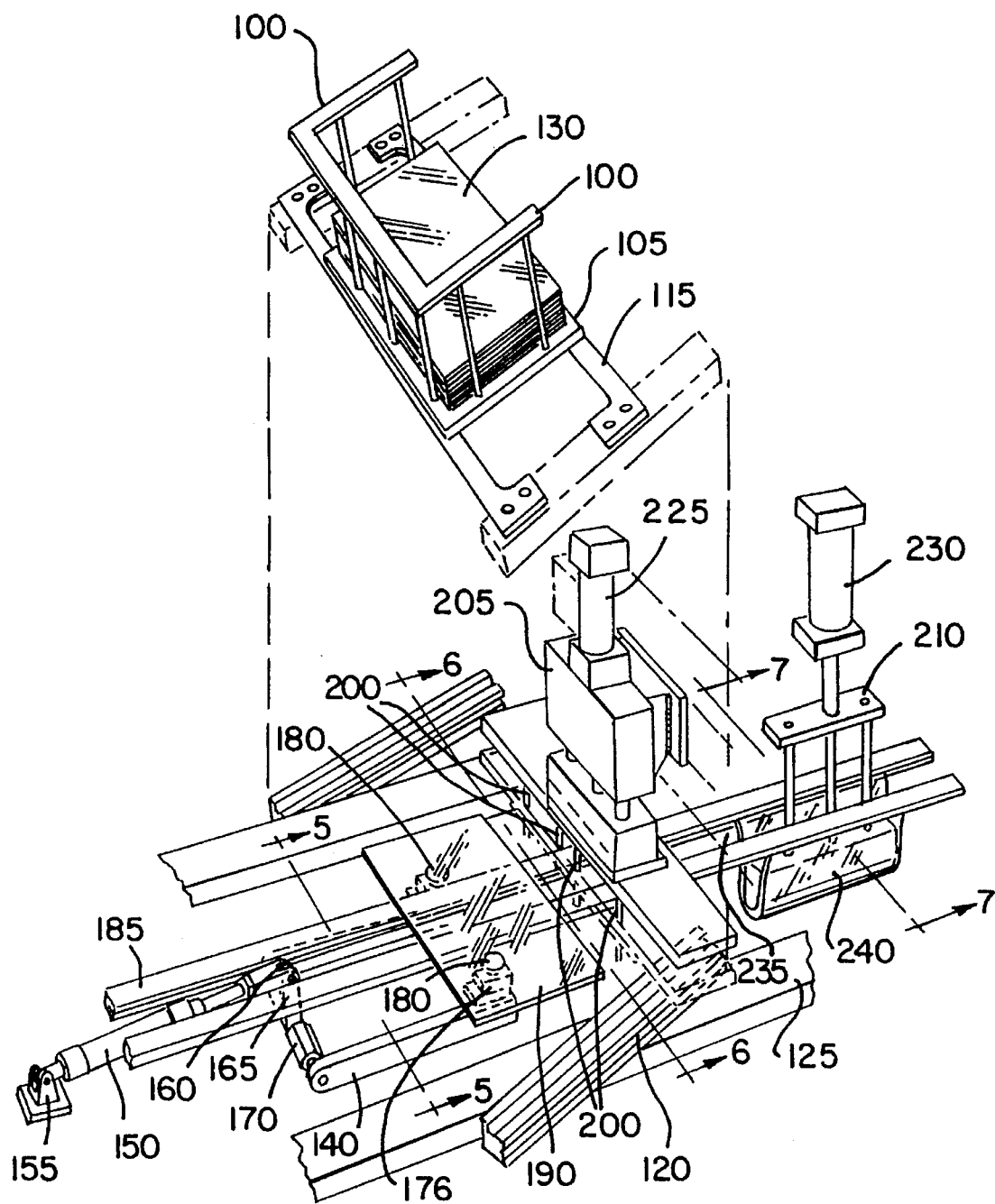
FIG. 3 is a partial perspective view of the first stage apparatus showing the placement of blanks for deformation into a U-shape.
Figure 4:
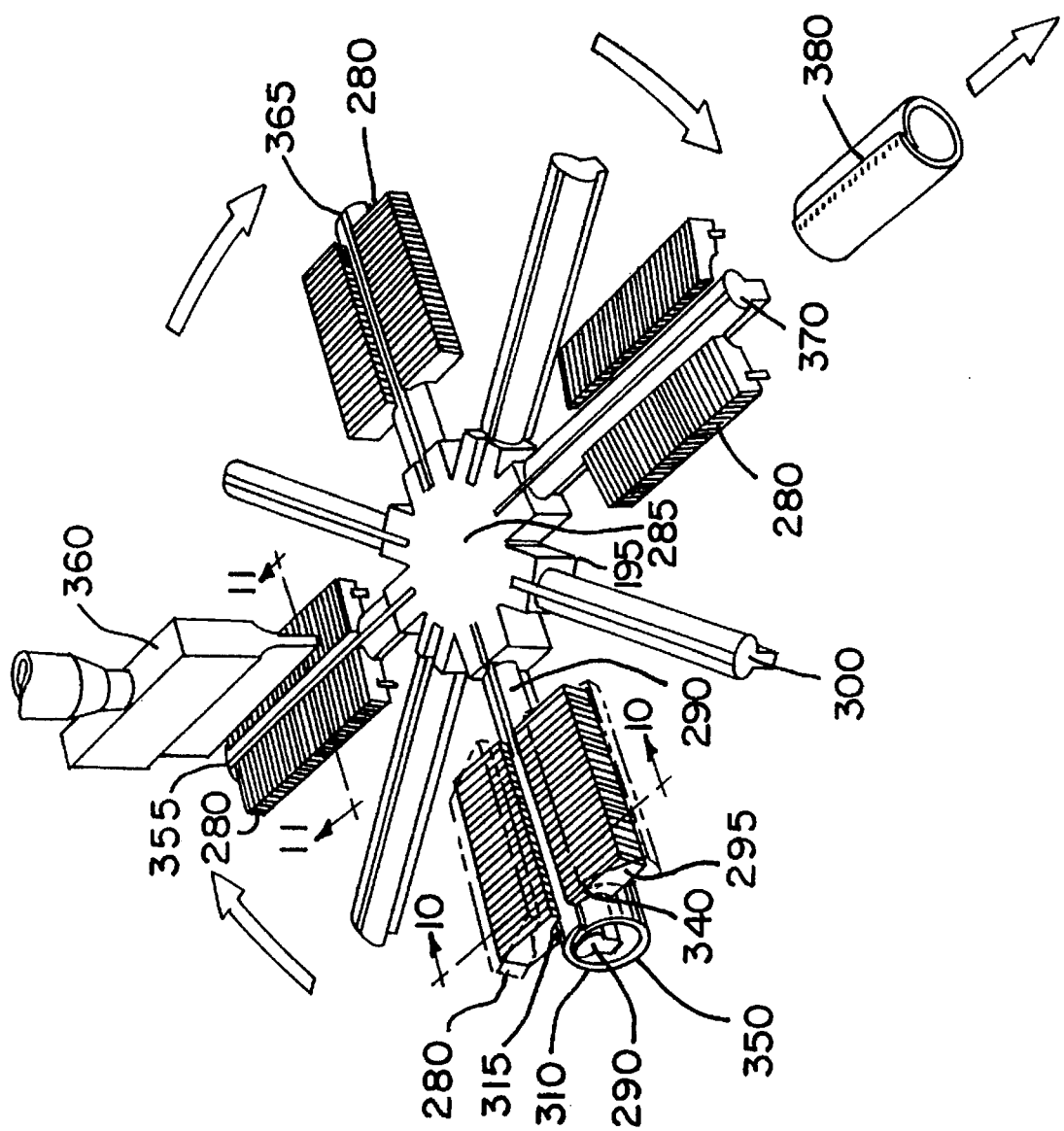
FIG. 4 is a partial perspective view of the first stage apparatus showing tube-forming and tube-welding.
Figure 5:
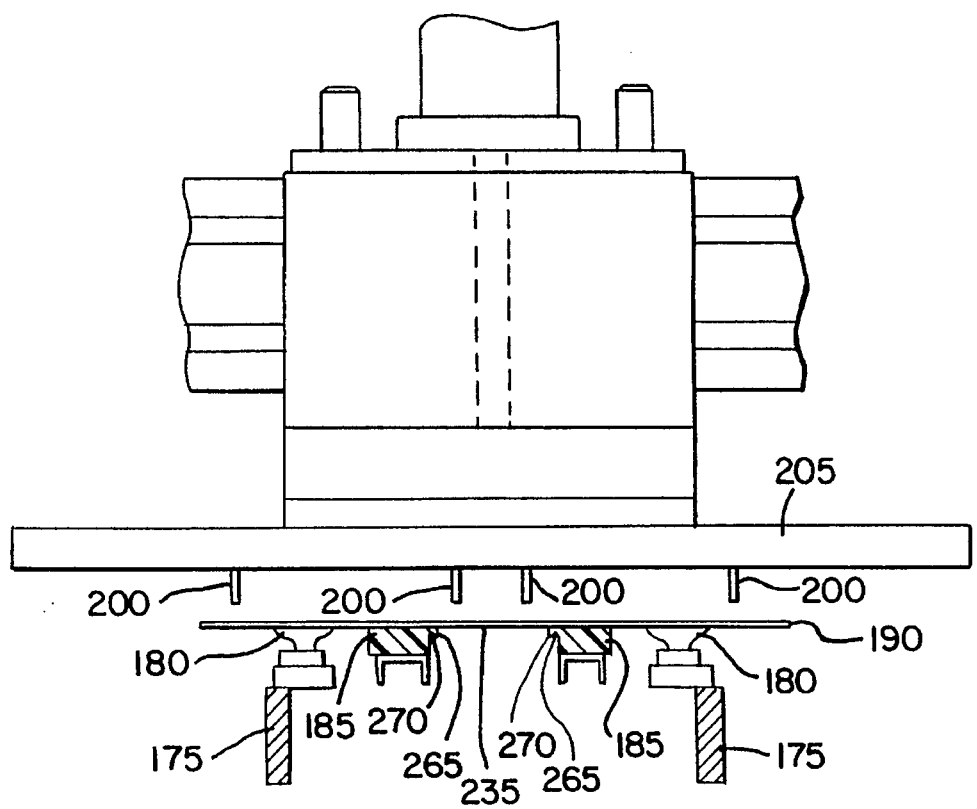
FIG. 5 is a cutaway elevation view of the first stage apparatus taken along the line 5—5 in FIGS. 1 and 3, showing the sidewall blank being unloaded onto the feed rails.

With reference to the drawings, FIG. 1 shows a perspective view of the first stage apparatus of the invention. The first stage can itself be viewed as occurring in two steps: a deformation step, wherein the sidewall blank is bent into a tubular configuration, and a joining step, wherein the side edges of the deformed sidewall are joined, as by welding, to complete the tube. FIG. 3 generally depicts the apparatus carrying out the deformation step, and FIG. 4 generally depicts the apparatus carrying out the joining step.

Figure 2:
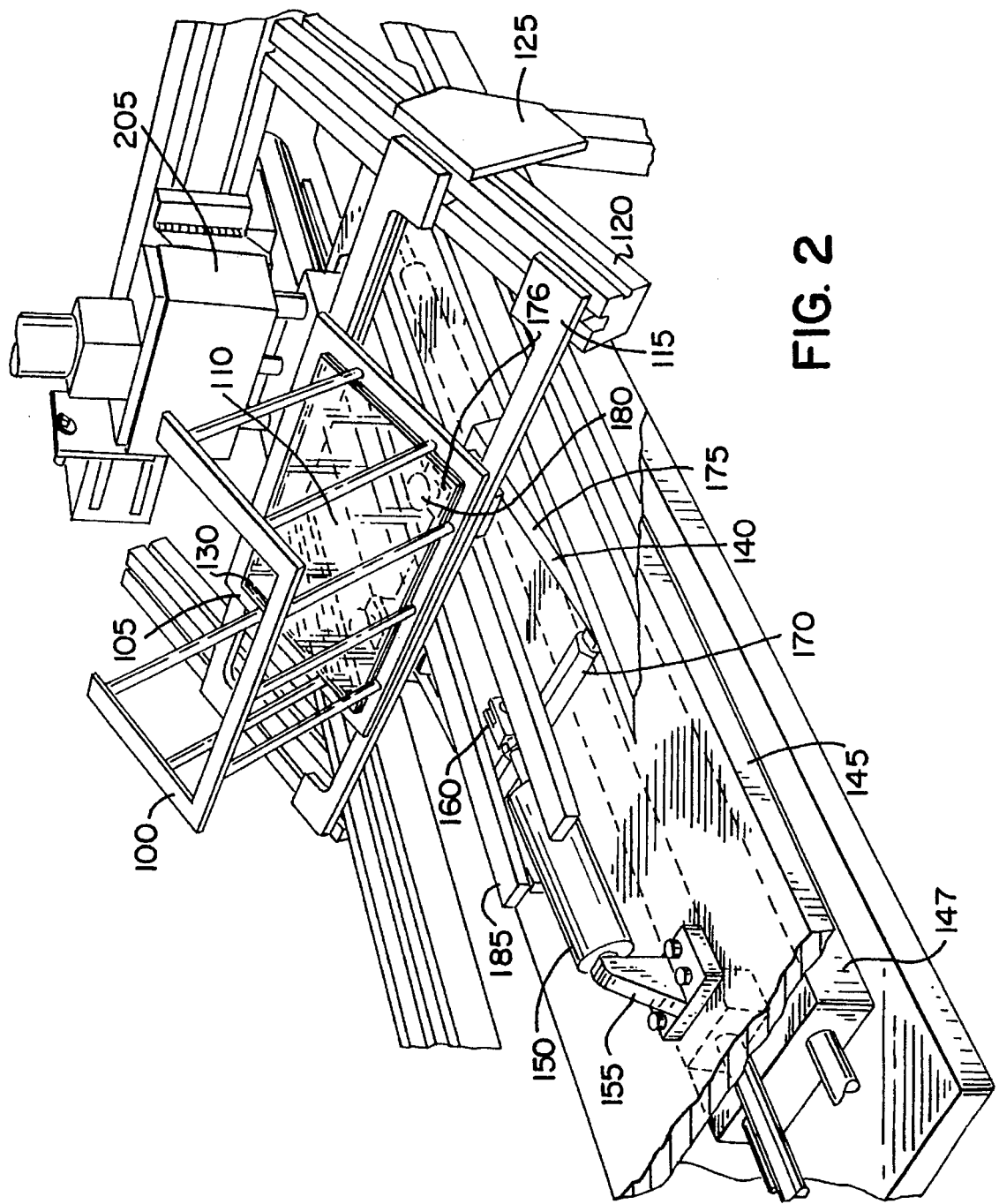
FIG. 2 is a partial perspective view of the sidewall magazine arrangement of the first stage apparatus.

With particular reference to FIGS. 2 and 3, a sidewall magazine 100 includes a loading frame 105 with a centrally located rectangular loading aperture 110. The loading frame 105 of the sidewall magazine 100 is fastened to a sidewall magazine base 115, which is in turn attached to a sidewall magazine bracket 120. The sidewall magazine bracket 120 is attached to a main frame 125. A desired number of sidewall blanks 130 are placed in a stack support on the loading frame 105, with the face of the sidewall blank that is meant to be the outer face of the tube (and thus the outer face of the canister) facing downward. In the present invention, it is preferred that the sidewall blanks be formed of a material and with a thickness such that the blanks are flexible but tend to resiliently attempt to maintain their initial flat shape. A major portion of the outer face of the bottom-most sidewall blank spans the loading aperture 110, which has a size such that only the side edges on the outer face of the sidewall blank come into contact with the loading frame 105. Underneath the sidewall magazine 100 is mounted an unloader 140, which is used to pull sidewall blanks 130 one at a time from the sidewall magazine 100 so that they may be advanced into the deforming mechanism. The unloader 140 is selectively advanced to extend through the loading aperture 110, grip the center of the outer face of the bottom sidewall blank and pull it down. The center of the sidewall blank bends downwardly as it is drawn down by the unloader and the side edges of the sidewall blank translate inwardly. When the side edges of the sidewall blank are drawn far enough inwardly that the side edges no longer support the sidewall blank on the surface of the loading frame 105, the sidewall blank pops through the loading aperture 110. The unloader 140 then positions the sidewall blank 130 for further processing. Since the sidewall blanks 130 are unloaded from the bottom of the sidewall magazine 100 in first-in first-out order, the sidewall magazine 100 may be restocked during operation as the stock of sidewall blanks 130 gets low without having to interrupt the operation of the machine. Alternatively, the empty sidewall magazine 100 may be removed from the sidewall magazine base 115 and replaced with a fully-stocked sidewall magazine 100. If a differently-sized sidewall blank 130 is to be used, a different sidewall magazine 100, whose loading aperture 110 is more appropriate to the size of the sidewall blank 130, may be necessary. As shown in FIG. 2, the sidewall magazine base 115 is large enough to accommodate a variety of differently-sized sidewall magazines 100.

As shown in FIGS. 1–3, the unloader 140 sits atop a feed carriage 145, to which it is attached, and below the sidewall magazine 100. The unloader 140 includes an unloading pneumatic cylinder 150, an unloading cylinder anchor 155 for the unloading pneumatic cylinder 150, a cylinder clevis 160, a lever arm 165, a unloading arm pivot 170 (attached to the feed carriage 145), and a forked unloading arm 175 with two branches. On each branch is an engagement air cylinder 176 to which a pneumatic suction cup 180 is attached. When the unloading pneumatic cylinder 150 is retracted, the lever arm 165 is pulled backwards, thereby tilting the attached unloading arm 175 about the unloading arm pivot 170 and moving the pneumatic suction cups 180 upwardly. The engagement air cylinders 176 then extend, pushing the pneumatic suction cups 180 onto the outer face of the bottom sidewall blank 130 in the sidewall magazine 100. Suction is applied to the pneumatic suction cups 180 so that they firmly grip the bottom sidewall blank 130. The unloading pneumatic cylinder 150 then extends and moves the unloading arm 175 downwardly, causing the unloading arm 175 to pull the bottom sidewall blank 130 out of the sidewall magazine 100 through the loading aperture 110. The unloading arm 175 lowers until the sidewall blank rests on the feed rails 185, which rest atop the feed carriage 145 adjacent to the unloading arm 175 and function as support surfaces for the sidewall blanks. In FIGS. 1 and 3, the unloaded sidewall blank shown resting on the feed rails 185 is designated at 190, and its bottom edge is shown in the cross-sectional view of FIG. 5.

Figure 6:
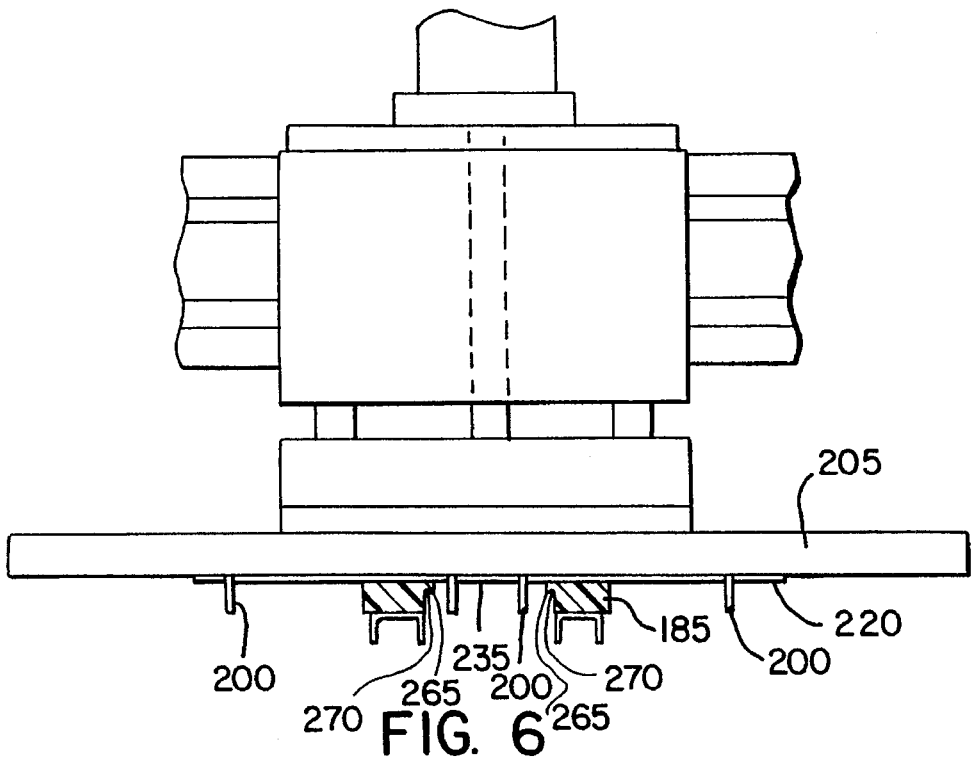
FIG. 6 is a cutaway elevation view of the first stage apparatus taken along the line 6—6 in FIGS. 1 and 3, showing the sidewall blank being restrained by the stop rake.

The feed carriage 145 can be pneumatically actuated to slide in its longitudinal direction, either towards or away from a welding wheel mechanism 195 (shown in FIGS. 1 and 4), carrying the attached unloader 140 and feed rails 185 with it. The feed carriage 145 rests atop, and is driven by, a slide 147 (e.g., a PHD Model CB slide). In FIG. 1, the feed carriage 145 is shown sitting in its initial position. At this point, the sidewall blank 190 has its face centrally located atop the feed rails 185 so that each feed rail 185 supports an equal amount of the sidewall blank 190. The pneumatic suction cups 180 on the unloading arm 175 are still actuated, applying suction to hold the sidewall blank 190 in place on the feed rails 185. The feed carriage 145 then moves forward, carrying the unloader 140 and the feed rails 185 mounted to it, so that the sidewall blank 190 passes under and beyond stop fingers 200 of a stop rake 205. The feed carriage 145 stops when it reaches its forward position with the sidewall blank 190 sitting under a ram 210. The suction cups 180 are then deactivated, releasing the sidewall blank 190, and the engagement air cylinders 176 retract the suction cups 180 into closer relation with the unloading arm 175. The sidewall blank in this position is designated at 220. As shown in FIG. 6, a rake pneumatic cylinder 225 is then actuated and the stop rake 205 comes down with its stop fingers 200 extending between the feed rails 185. The feed carriage 145 then retracts to its initial position. As it does so, the sidewall blank 220 strikes the stop fingers 200 of the stop rake 205. The stop rake 205 keeps the sidewall blank 220 in place as it slides atop the retracting feed rails 185, thereby preventing the sidewall blank 220 from returning to the initial position along with the feed carriage 145. When the feed carriage 145 reaches its initial position, the stop rake 205 retracts upwardly, removing its stop fingers 200 from the path along the feed rails 185.

Figure 7:
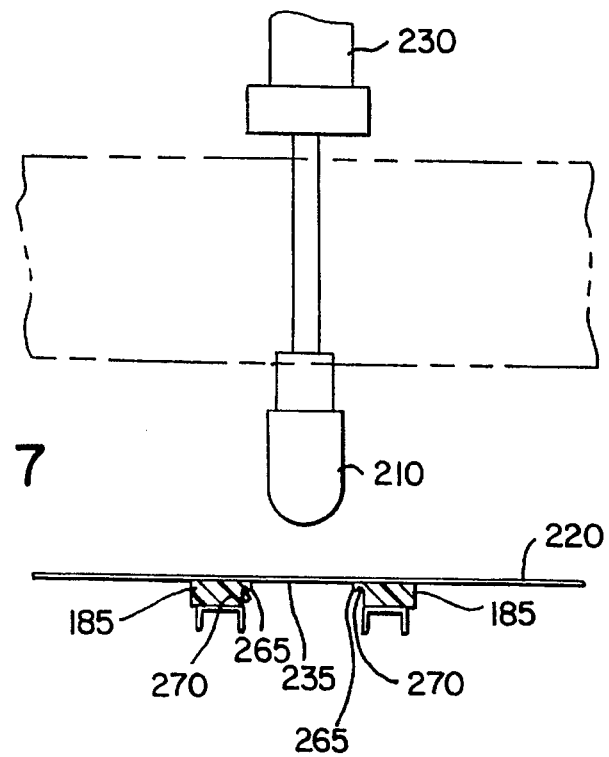
FIG. 7 is a view, partially in cross-section, of the first stage of the apparatus taken along the line 7—7 in FIGS. 1 and 3, showing the ram descending upon the sidewall blank.
Figure 8:
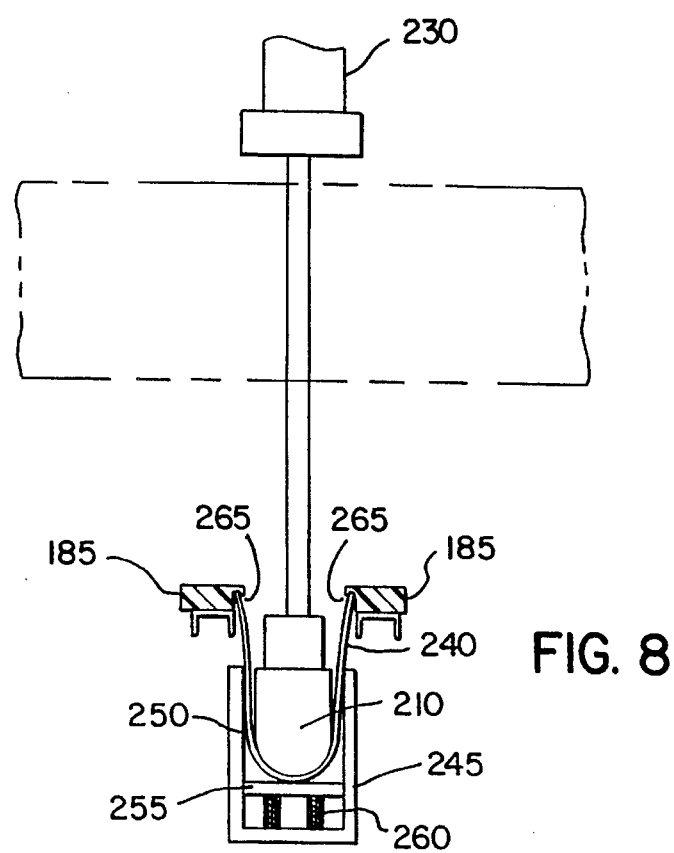
FIG. 8 is a view as in FIG. 7 showing the ram deforming the sidewall blank.

The sidewall blank 220, as shown in FIG. 7, is now ready to be deformed into a "U"-shaped configuration. A ram pneumatic cylinder 230 is actuated and a ram 210 extends downwardly and engages the center of the inner face of the sidewall blank 220, pressing it downwardly into a ram gap 235 between the feed rails 185 as shown in FIG. 8. As the ram 210 pushes the sidewall blank downwardly into the ram gap 235, the sidewall blank, designated at 240 in FIG. 8, deforms into a "U"-shape with the outer face of the sidewall blank on the outside of the curve and the inner face of the sidewall blank on the inside of the curve. Alternative means of deforming the sidewall blank into a "U"-shape may be used instead of a ram action, such as by engaging the top and bottom edges of the sidewalls near their centers and pulling them downwardly into the ram gap. As the sidewall blank 240 deforms, the side edges of the sidewall blank 240 translate towards the ram gap 235. In the ram gap 235, underneath the ram 210 and the feed rails 185 and attached to the feed carriage 145, lies a restraining channel member 245. The restraining channel member 245 includes two opposing parallel channel walls 250 with a space between them approximately equal to the distance between the feed rails 185, and an inner channel floor 255 which rests on a spring bed 260 between the channel walls 250. The ram 210 eventually pushes the outer face of the sidewall blank 240 onto the channel floor 255, which is displaced as the spring bed 260 compresses. During the deformation process, on the other side of the stop rake 205, another sidewall blank 190 is being unloaded onto the feed rails 185 so that it may be subjected to the same process.

To accommodate differently-sized sidewall blanks 240, the apparatus preferably utilizes holding means which position the side edges of the sidewall blanks 240 in a fixed reference location so that the side edges can be properly joined for any blank over a range of sizes of the blank. Proper alignment of the edges of each blank is provided by a rail lip 265 which extends inwardly from the sides of the feed rails 185 adjacent to the ram gap 235. A rail groove 270, located under each rail lip 265, catches the side edges of the sidewall blank 240 and holds them to thereby maintain the side edges in a known location. As the ram 210 continues to push the sidewall blank 240, the side edges of the sidewall blank 240 are eventually depressed past the edges of the rail lips 265 on the sides of the feed rails 185 and the entire sidewall blank 240 is forced into the ram gap 235, with the center of the outer face pushing against the channel floor 255 and the side edges on the outer face resting against the channel walls 250. The resilient material of the blank causes the side edges of the blank to spread outwardly under the grooves 270 as the deformed blank attempts to return to its undeformed state. Shortly afterwards, the ram 210 stops moving downwardly and retracts out of the ram gap 235. As the ram 210 retracts, the force on the spring bed 260 is relieved and the channel floor 255 moves back towards its original position, pushing the "U" shaped sidewall blank 240 upwardly so that the side edges of the sidewall blank 240 slide into the rail grooves 270. The sidewall blank 240 then rests in a "U" shaped configuration, with the center of its outer face against the channel floor 255 and with the side edges of the outer face resting in the rail groove 270 below the rail lip 265. The spring bed 260 and channel floor 255 and the resiliency of the sidewall blank 240 force the side edges into the rail groove 270; this insures that the side edges are located at a standard reference location, regardless of the size of the sidewall blank 240. The side edges of the sidewall blank 240 remain firmly held in the rail groove 270 by the pressure applied by the spring-loaded channel floor 255. The length of the stroke of the ram 210 and the depth of the restraining channel member 245 (and the distance that the spring bed 260 may be compressed) constrain the size of the sidewall blank 240 that can be used. The sidewall blank 240 must be small enough that the ram 210 can bend it into a "U"-shape and push it into the restraining channel member 245. The stroke of the ram 210 may be lengthened and the size of the restraining channel member 245 may be enlarged to accommodate sidewall blanks of greater size.

Figure 9:
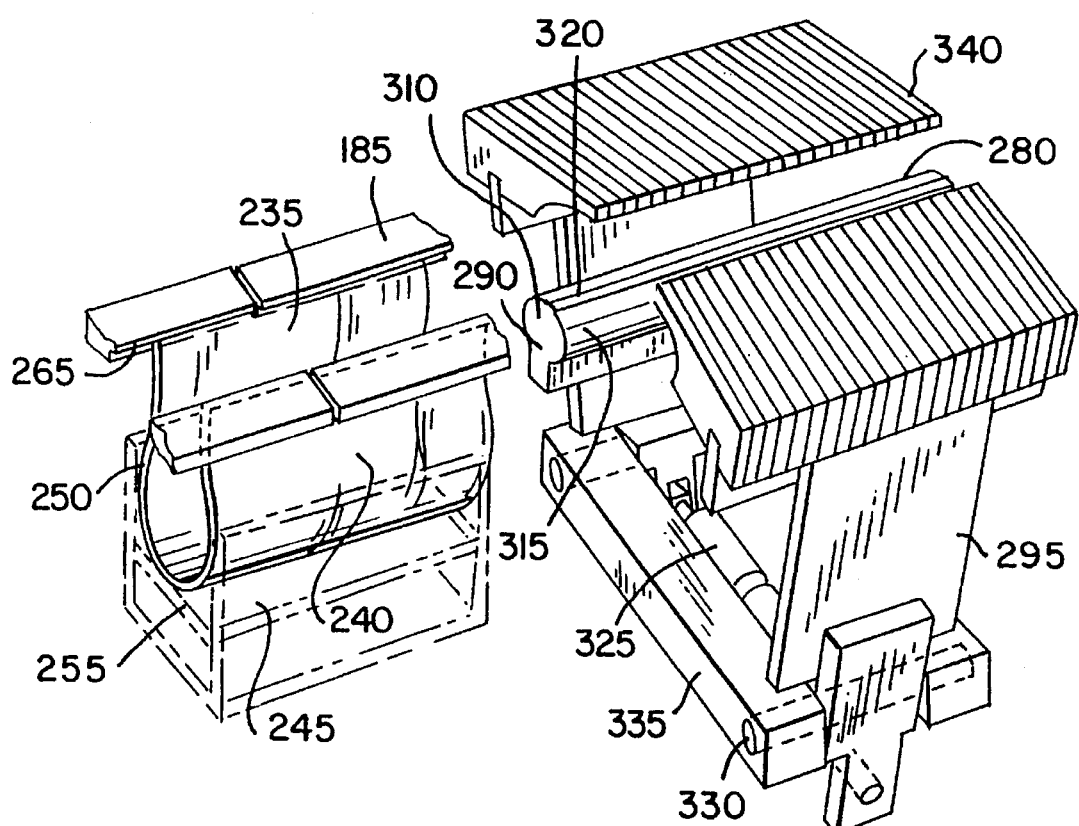
FIG. 9 is a partial perspective view of the first stage apparatus showing the deformed sidewall blank immediately before it is transferred over the mandrel.
Figure 10:
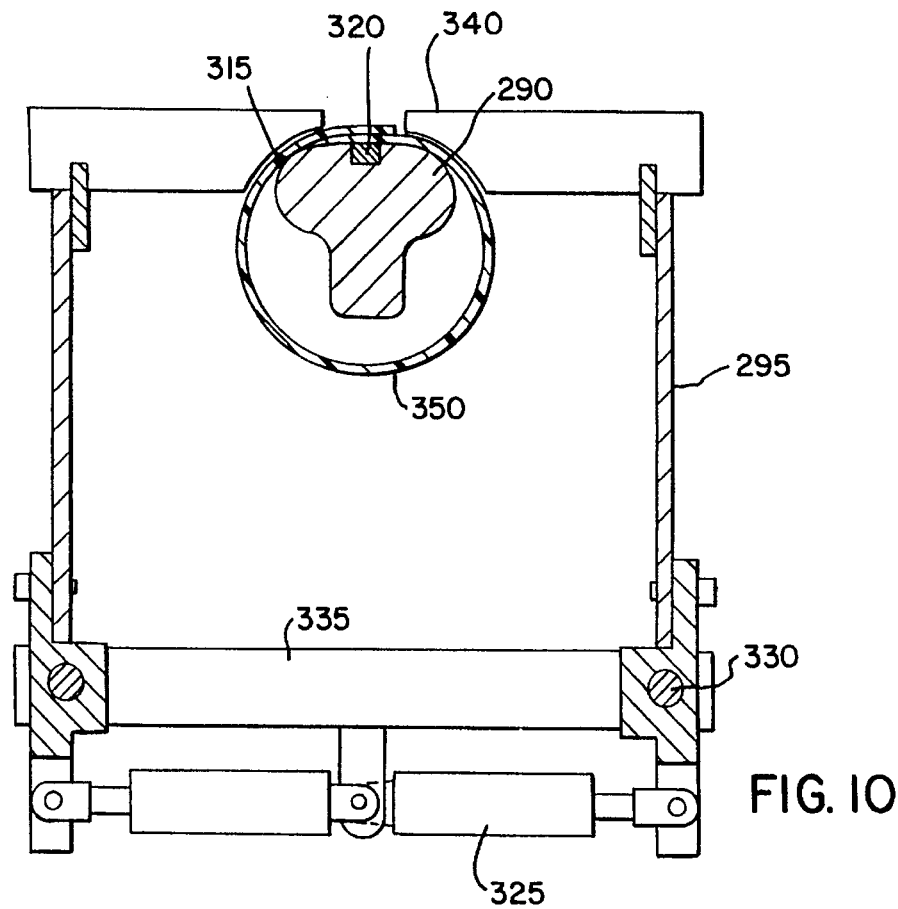
FIG. 10 is a cross-sectional view of the first stage apparatus taken along the line 10—10 in FIGS. 1 and 4, showing the clamping jaws pushing the side edges of the sidewall blank onto the mandrel to form a tube.
Figure 11:
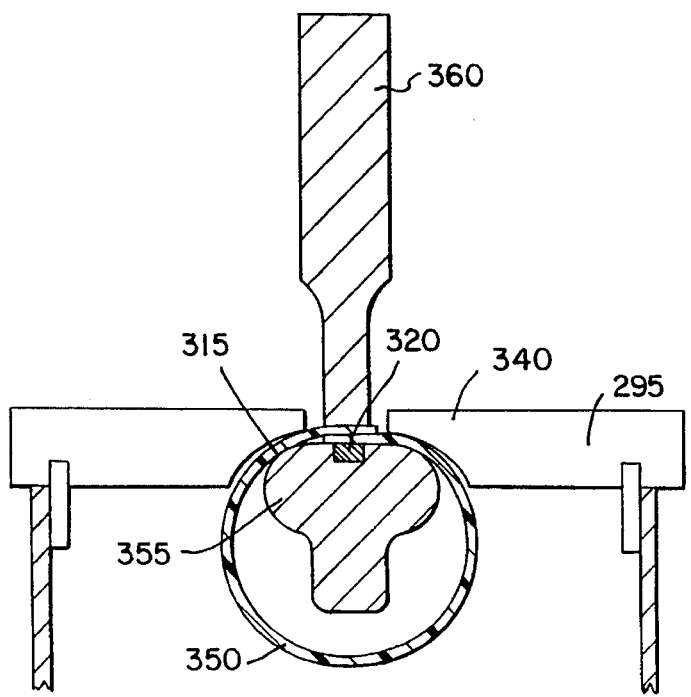
FIG. 11 is a partial cross-sectional view of the first stage apparatus along the line 11—11 in FIGS. 1 and 4, showing the ultrasonic welder welding the tube seam.

The second step in the tube-forming process is to close the "U" and join the edges of the sidewall blank 240 at a seam, finishing the tube. This is accomplished by the welding wheel mechanism 195, generally shown in FIGS. 1 and 4. The welding wheel mechanism 195 is located just beyond the feed carriage 145 when the feed carriage 145 is in its initial, retracted position. The welding wheel mechanism 195 consists of a horizontal group of four welding units 280 which rotate about a common hub 285. Each welding unit 280 includes a mandrel 290 located between a set of clamping jaws 295. The four welding units 280 are attached to the hub 285 at 90 degree intervals with the mandrels 290 extending radially outward from the hub 285. Other unused mandrels 300 are shown interspersed between the welding units 280; these may be modified so that they may be used to perform additional processing steps as needed or to constitute complete welding units to allow an increased rate of production. The welding wheel mechanism 195 has four stations at which the welding units 280 dwell while an operation is performed on the formed sidewall blank. At a primary station 310, one of the welding units 280 is aligned so that a mandrel 290 lies parallel to the feed rails 185, with its top just below the level of the feed rails 185 as best shown in FIG. 9. The top surface of each mandrel is curved in a generally cylindrical manner to define a mandrel clamping surface 315 which, with the aid of clamping jaws 295, helps shape and hold the sidewall blank for welding. A welding strip 320 lies along the length of the mandrel 290 at its very top. The welding strip 320 is preferably formed as an insert within the body of the mandrel 290 which is specially prepared to withstand the energies of the welding process. In the preferred embodiment of the invention, the welding strip 320 has a knurled surface. The knurls have been found to enhance the weld strength when ultrasonic welding is performed on various plastic tube blank stock, including amorphous polyethylene terepthalate. The clamping jaws 295 are actuated by a pair of jaw pneumatic cylinders 325 so that they pivot about jaw pins 330 and a jaw frame 335 and approach the mandrel 290, which lies between the clamping jaws 295. The clamping jaws 295 each include a set of clamping fingers 340 which are constructed so that the clamping fingers 340 move under the feed rails 185 and towards the mandrel clamping surface 315 as the clamping jaws 295 are closed. The lower surface of the clamping fingers 340 are contoured with a concave shape so that they engage the sides of the "U"-shaped blank 240 and closely approach the mandrel clamping surface 315 when the clamping jaws 295 close. When they are fully closed, only the welding strip 320 is left uncovered.

When the clamping jaws are in the position shown in FIG. 9, the feed carriage 145 extends towards the welding wheel mechanism 195. As the feed carriage 145 moves to its forward position, the inner curve of the "U" shaped sidewall blank 240 is invaded by the mandrel 290. The mandrel 290 has a periphery small enough that the entire "U" is not filled. A close fit between the mandrel 290 and the "U" is not necessary, as the sidewall blank 240 will contact the mandrel 290 only along the mandrel clamping surface 315; therefore, the mandrel 290 only needs to fill the top portion of the "U" in order for a tube to be formed.

When the feed carriage 145 fully reaches the forward position, the clamping jaws 295 are closed. As the clamping jaws 295 close, the tips of the clamping fingers 340 push against the side edges of the outer face of the sidewall blank 240 and strip them out of the rail groove 270, forcing the side edges of the sidewall blank 240 and the inner face of the sidewall blank 240 against the mandrel clamping surface 315. One clamping jaw 295 closes on the sidewall blank 240 slightly later than the other. This causes the side edges of the sidewall blank 240 to overlap, with the side edge on the side of the later clamping jaw 295 overlapping the other side edge. The overlapping side edges lie over the welding strip 320. The sidewall blank 240 is now firmly gripped between the clamping jaws 295 and the mandrel 290, and the feed carriage 145 (and the feed rails 185 and restraining channel member 245 with it) is withdrawn back to its initial retracted position. The sidewall blank so formed is designated at 350 in FIG. 4; it is also shown in the cross-sectional view of FIG. 10. After the feed carriage 145 retracts, the welding wheel mechanism 195 rotates, carrying the sidewall blank 350 to the second station 355 so that it may be welded.

After the welding wheel mechanism 195 rotates 90 degrees so the welding unit 280 is located at the second station 355, the welding wheel mechanism 195 pauses. A pneumatically-actuated welder 360 descends and presses the overlapping side edges of the sidewall blank 350 to the welding strip 320, as best shown in the cross-sectional view of FIG. 11. The welder 360 is then energized and the overlapping side edges are joined at a seam to fully form a tube 380. Preferably, the welder 360 is an ultrasonic welder, although heat sealing welders may be used with appropriate thermoplastic blank materials. The ultrasonic welder 360 then recedes, the welding wheel mechanism 195 rotates another 90 degrees, and the welding unit 280 reaches a third station 365 where a second weld may be performed over the first if greater weld strength is desired. The welding wheel mechanism 195 then revolves another 90 degrees to a removal station 370 where the completed tube 380 is pulled or ejected from the mandrel 290. The tube 380 may then be transferred to the second stage apparatus of the invention, where it may be formed into a canister.

Figure 12:
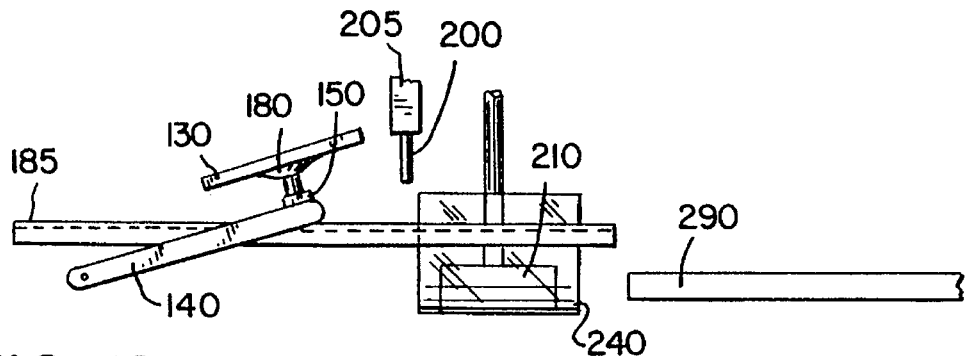
FIG. 12 is a simplified side elevation view of the first stage apparatus showing the unloading of one sidewall blank and the simultaneous deformation of another.
Figure 13:
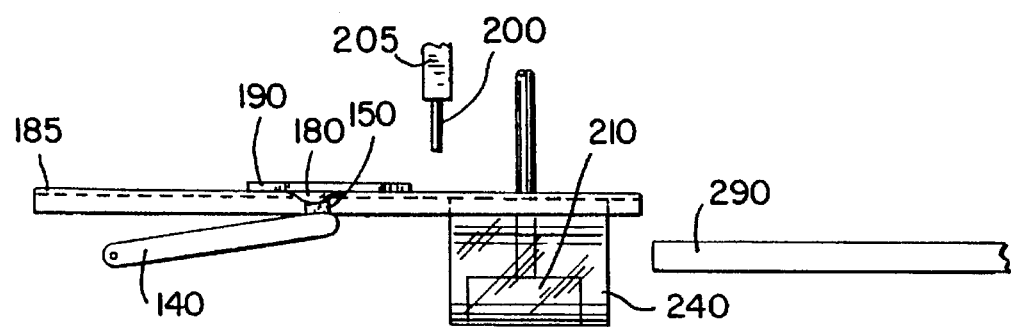
FIG. 13 is a view as in FIG. 12 showing the further unloading and deformation of the sidewall blanks.
Figure 14:
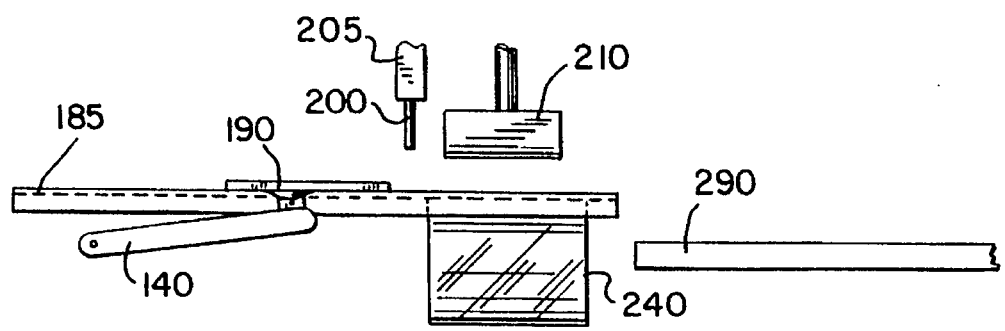
FIG. 14 is a view as in FIG. 12 showing the further unloading of one sidewall blank and the holding of the other sidewall blank in its deformed position.
Figure 15:
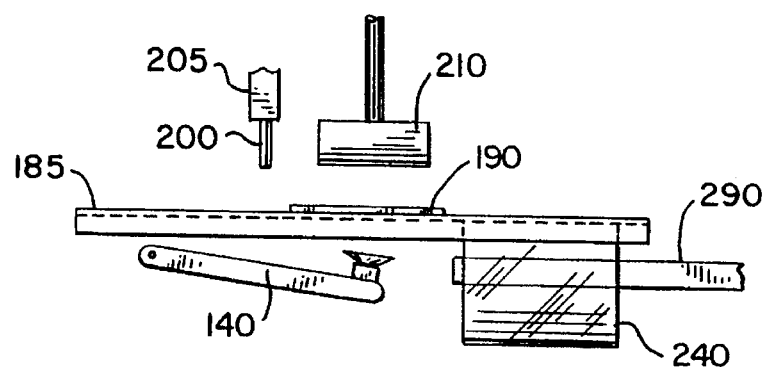
FIG. 15 is a view as in FIG. 12 showing one sidewall blank being positioned for deformation as another is transferred to a position around a welding support mandrel.
Figure 16:
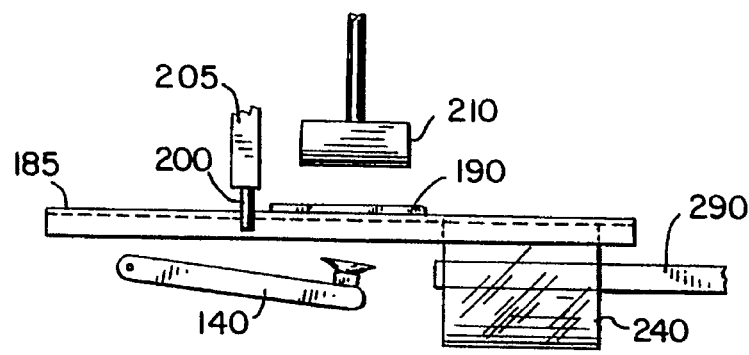
FIG. 16 is a view as in FIG. 12 showing the further positioning of the sidewall blank to be deformed.
Figure 17:
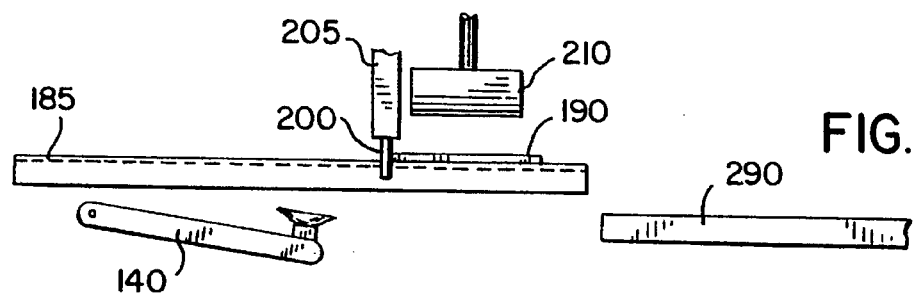
FIG. 17 is a view as in FIG. 12 showing the final position of the sidewall blank to be deformed, with the other sidewall blank transferred to another station for welding.
Figure 18:
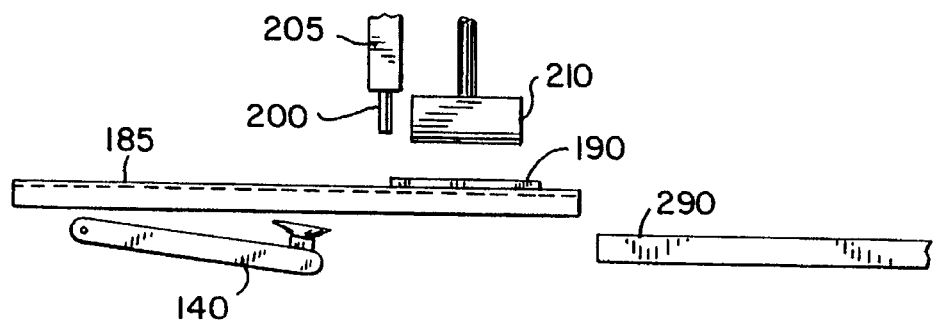
FIG. 18 is a view as in FIG. 12 showing the sidewall blank immediately before the deformation process shown in FIG. 12.

To illustrate further the sequential operation of the first stage apparatus of the invention, FIGS. 12–18 show in order the steps for the deformation of a blank into a tube. In FIG. 12, a sidewall blank 130 is unloaded from the sidewall magazine (not shown) by the unloader 140. At the same time, a previously unloaded sidewall blank indicated at 240 is being deformed by the ram 210. In FIG. 13, the sidewall blank is laid on the support rails 185, the supported blank now being indicated as 190 for clarity of illustration. In FIG. 13, the ram has descended sufficiently that the side edges of the sidewall blank 240 have slipped past the edges of the feed rails 185 into the ram gap 235 and restraining channel member 245 (not shown). In FIG. 14, the unloader 140 is shown holding a sidewall blank 190 atop the feed rails 185. The ram 210 has withdrawn, and the spring bed 260 of the restraining channel member 245 (not shown) has pushed the side edges of sidewall blank 240 into the rail grooves 270 (also not shown) so that the sidewall blank 240 is held in its deformed position. As shown in FIG. 15, the feed rails 185 then transfer to their forward position, with the sidewall blank 190 moving beneath the stop rake 205 and with the "U" curve of the sidewall blank 240 translating over the mandrel 290. The open clamping jaws 295, which are not shown, surround the mandrel 290 with the clamping fingers 340 resting just below the feed rails 185. In FIG. 16, the stop rake 205 with stop fingers 200 descends at the same time that the clamping jaws 295 close, pinning the side edges of the sidewall blank 240 to the mandrel clamping surface 315. In FIG. 17, the feed rails 185 are shown moving back to their initial position, and the sidewall blank 190 strikes the fingers 200 of the stop rake 205 and so is restrained from moving back with the feed rails 185. The welding wheel mechanism 195 has revolved so that the mandrel 290, with a sidewall blank 240 clamped to it, has moved beneath the ultrasonic welder 360, and a new mandrel 290 has moved into position. In FIG. 18, the stop rake 205 is drawn up, and the sidewall blank 190 is then in a position to be engaged by the ram 210 to be deformed into the U-shaped blank 240. A new sidewall blank may then be unloaded as shown in FIG. 12 and the process may begin anew.

The completed tube 380 is then ready to enter the second stage apparatus of the invention, wherein the canister is formed by welding a canister base to the bottom edge of the tube 380. The canister bases may be formed in a conventional manner to the desired shape for welding to the tube 380. The canister bases preferably are formed as circular thermoplastic disks having at least a depending skirt around the periphery of the disk with the skirt extending preferably at a normal to the plane of the disk. Additional features may be added to the canister bases, such as a lip extending upwardly from the depending skirt whereby the tube 380 may be placed with its bottom edge in the groove between the lip and skirt, as described further below, but at a minimum the canister base must have the skirt in order for the canister to be properly formed.

Figure 19:
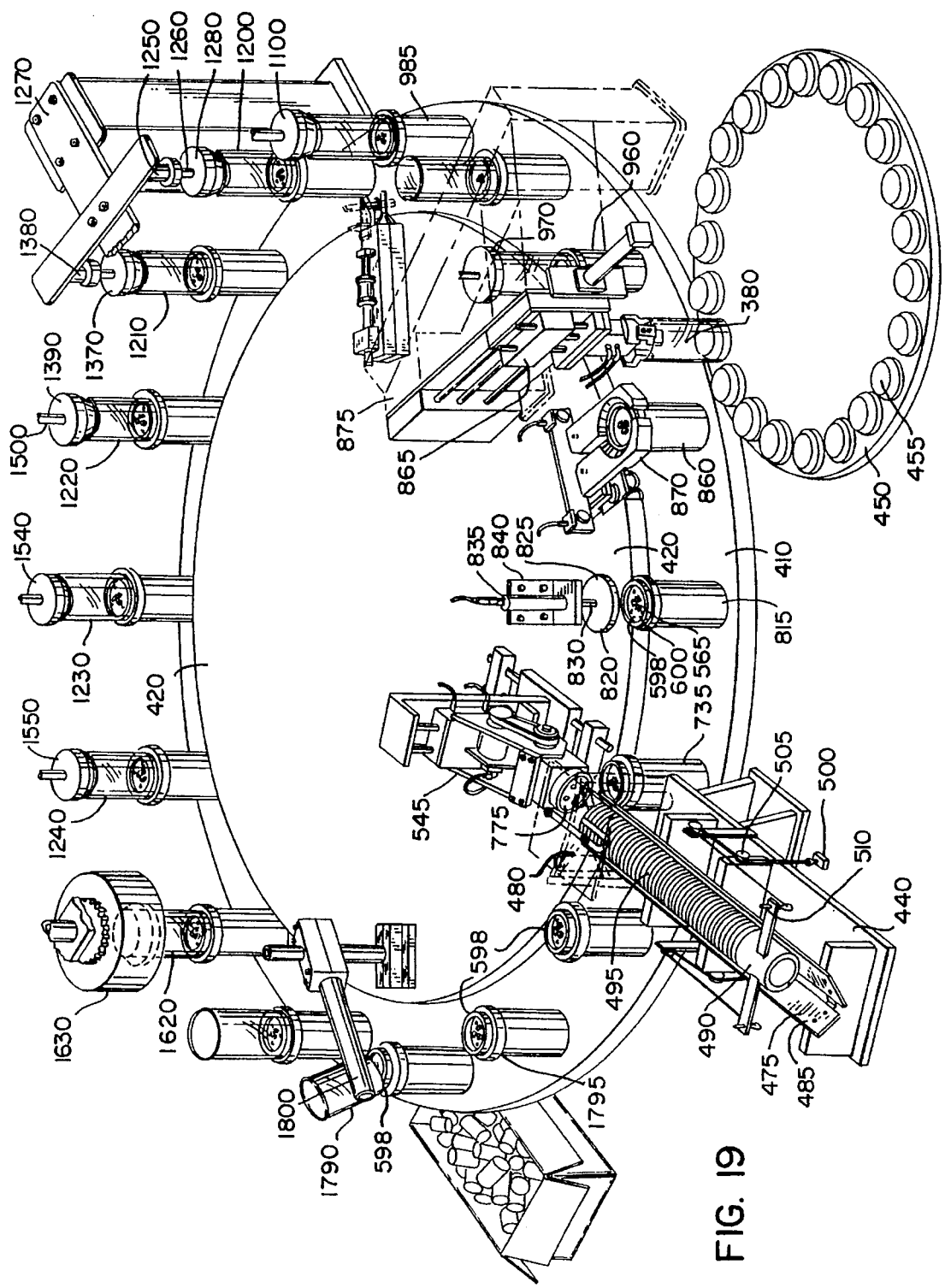
FIG. 19 is a perspective view of the second stage apparatus of the invention wherein canister bases are joined to the tubes to complete the canister.
Figure 20:
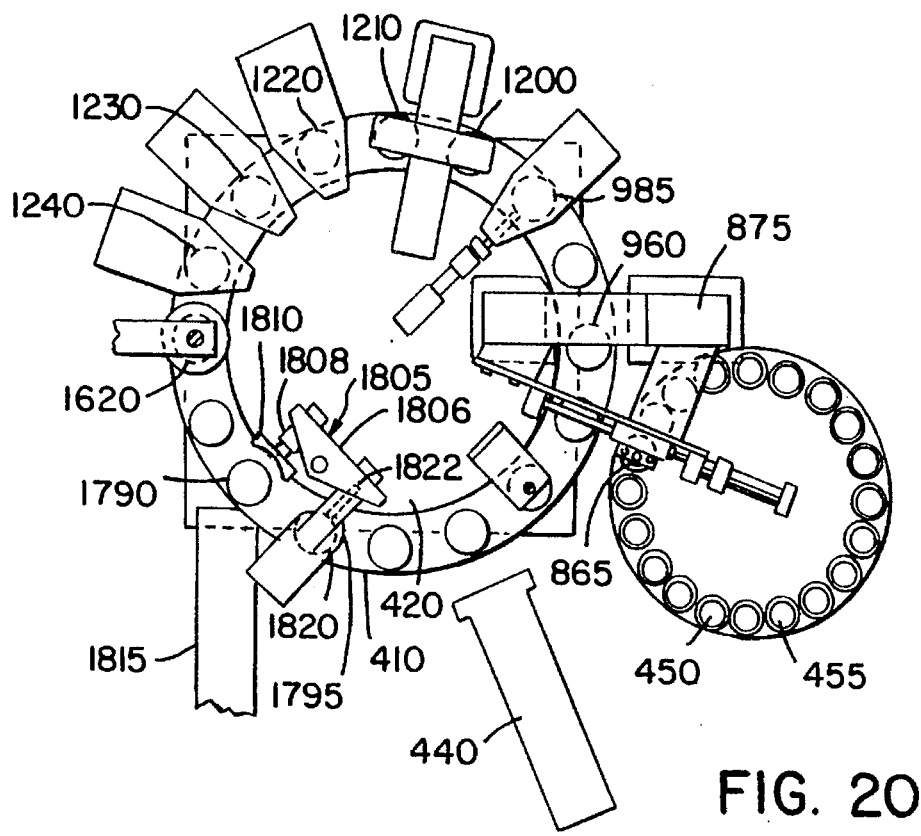
FIG. 20 is a simplified top plan view of the second stage apparatus of the invention.
Figure 22:
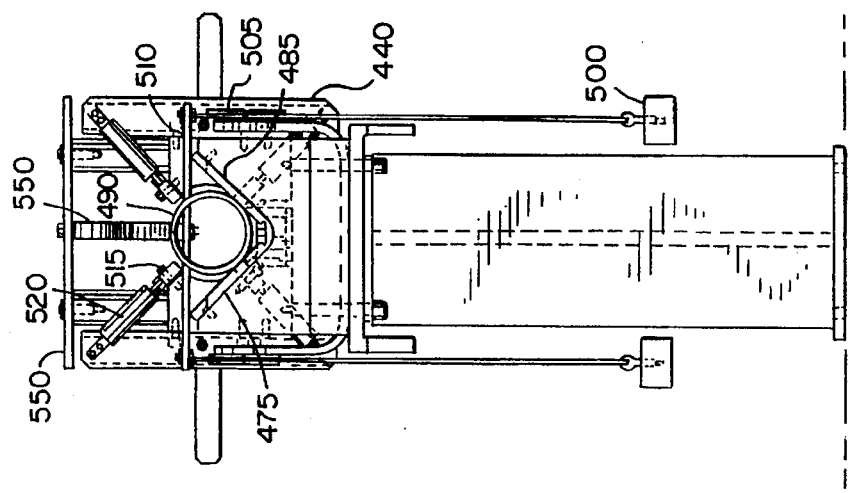
FIG. 22 is an front elevation view of the canister base feeding magazine.
Figure 21:
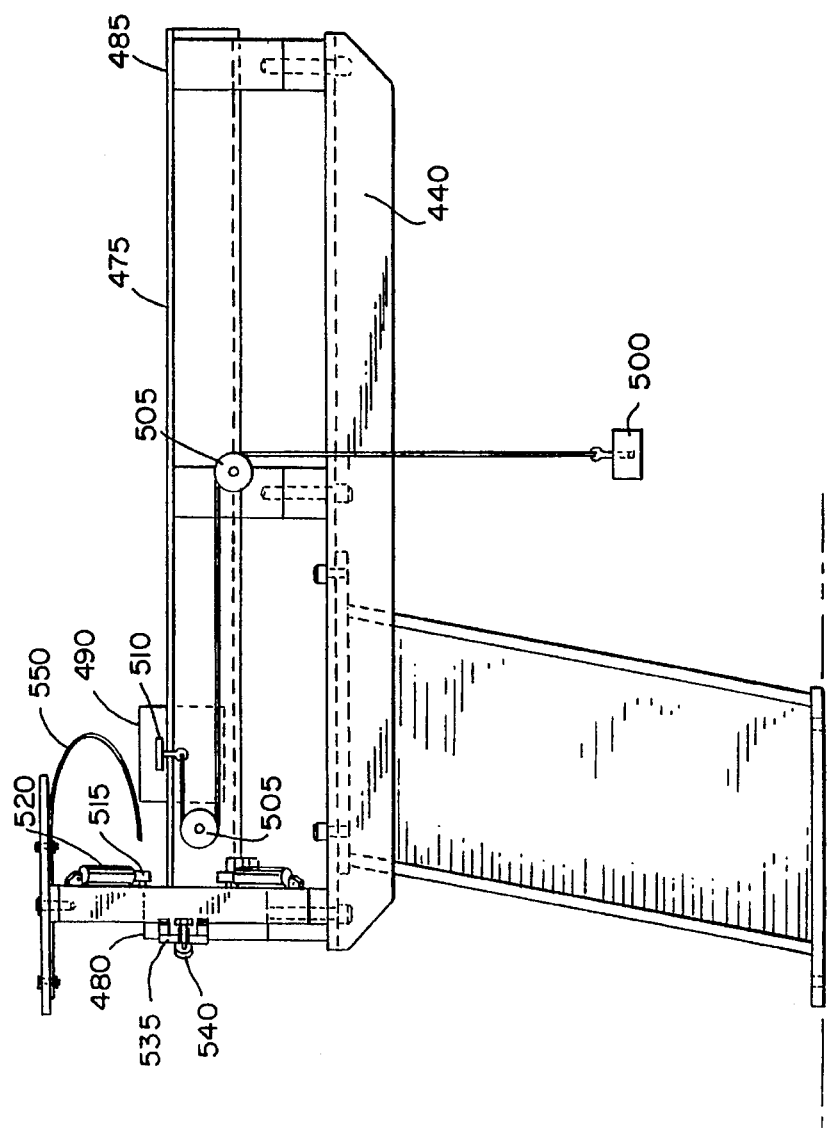
FIG. 21 is an side elevation view of the canister base feeding magazine.

The second stage apparatus of the invention is shown in overall perspective in FIG. 19 and in a schematic plan view in FIG. 20. The tubes and canister bases in various stages of completion ride upon a rotating operating platform 410 as operations are performed. Some of the apparatus that performs processing operations on the tubes and canister bases sits upon a circular stationary platform 420 located in the middle of the operating platform 410. Located next to the operating platform 410 is a canister base feeding magazine 440, which supplies the canister bases to the second stage apparatus, and a tube supply turntable 450, upon which the tubes 380 are supported for supply in proper sequential order to be transferred to the operating platform 410.

The tube supply turntable 450, shown in FIGS. 19, 20, 32, and 33, is a circular table which rotates about its central axis. A number of tube supply mandrels 455 are spaced at regular intervals in a ring around the central axis of the tube supply turntable 450. An operator or a robot arm (not shown) places the tubes 380 from the first stage apparatus on the tube supply mandrels 455, with one tube per tube supply mandrel, so that the tube supply mandrels 455 engage the inner sidewalls of the tubes 380. The regular spacing of the tube supply mandrels 455 allows easy location of a tube supply mandrel 455, and thus a tube, when a tube is needed for processing into a canister.

The canister base feeding magazine 440, shown in FIGS. 19–22, includes a horizontally oriented V-shaped channel 475, with the operating platform 410 sitting just beyond a channel escapement 480 mechanism at the end of the channel 475. At the channel foot 485 rests a movable channel wedge 490, which may slide through the length of the channel 475. A stack of canister bases 495 is placed in the channel 475 so that they are adjacent to the channel wedge 490, with the plane of the canister bases 495 perpendicular to the channel walls, and with the faces of the canister bases 495 that are to form the outside bottoms of the canisters facing the channel foot 485. A channel weight 500 and a channel pulley 505 arrangement pulls wedge struts 510 and drives the channel wedge 490 towards the canister bases 495, pushing them towards the channel escapement 480. The channel escapement 480 is shown in greater detail in the frontal elevation view of FIG. 23, the plan view of FIG. 23A, the side elevation view of FIG. 21, and the rear elevation view of FIG. 22. It is shown in FIG. 19 only in phantom. A set of four escapement fingers 515 sits just before the channel escapement 480. The escapement fingers 515 are aligned so that the faces of the canister bases 495 rest against the escapement fingers 515 as they are pushed towards the channel escapement 480. Each escapement finger 515 is actuated by a finger air cylinder 520, e.g. a Bimba pneumatic cylinder, which operates the escapement finger 515 through finger link 525 and causes the escapement fingers 515 to rotate about finger pivots 530. An escapement finger 515 is shown in greater detail in FIG. 25.

Mounted at the channel escapement 480 are two metering fingers 535, which are positioned with air spring cylinders 540, e.g. Bimba pneumatic spring cylinders. The channel wedge 490 pushes the canister bases 495 towards the channel escapement 480. When a canister base loading arm 545 is positioned next to the channel escapement 480, the escapement fingers 515 momentarily open to allow the canister bases 495 to advance by the thickness of a single canister base. The escapement fingers 515 then close to retain all but one canister base 495. The canister base loading arm 545 then engages this canister base 495 and begins to retract. As it does so, the canister base 495 pushes the metering fingers 535 and momentarily forces them open. These metering fingers 535 serve as a secondary stop in the event that a second canister base might follow the first canister base 495 and fully or partially pass the escapement fingers 515, thereby insuring that only one canister base at a time is supplied to the canister base loading arm 545. The channel escapement 480 also includes a spring-loaded tab 550, which pushes the stack of canister bases 495 downwardly to inhibit upward movement of the stack of canister bases 495 as the escapement fingers 515 operate. The pressure in the finger air cylinders 520 and air spring cylinders 540 may be adjusted so that they may accommodate differently-sized canister bases 495.

As shown in FIG. 19, the operating platform 410 contains a number of forming platforms 565. FIGS. 26–29 show a forming platform 565 in greater detail. Each forming platform 565 includes a circular platform plate 570 with a centrally located platform stem 575 on its bottom. The platform stem 575 is retained within a pair of bearings 580 which are seated in a platform shell 585. The platform shell 585 is attached to the surface of the operating platform 410 by holding screws 595. The bearings 580 support each platform stem 575 and allow each forming platform 565 to freely rotate about the axis of the platform stem 575 if a driving force for rotation is applied. The forming platforms 565 are located at regular intervals along a circular path about the axis of rotation of the operating platform 410.

Atop the forming platform 565 is a forming support 598 having a top forming surface 600 which acts to engage and support the canister bases. The forming support 598 is shown in combination with the forming platform 565 in FIG. 26, and several views of the forming support 598 alone are shown in FIGS. 27–29. FIG. 27 shows a plan view of the forming support 598, FIG. 28 shows a cross-sectional view along the lines 28—28 in, FIG. 27, and FIG. 29 shows a side elevation view. The forming support 598 is comprised of a circular surface plate 605 with a centrally located surface stem 610 extending from its bottom. A forming surface 600 is located atop the forming support 598. The forming surface 600 includes a forming surface rim 615, which rises above the remainder of the forming surface 600 and extends about its periphery. It is upon the forming surface 600 that a tube and a canister base ride as they are formed into a canister. The operating platform 410 rotates intermittently, stopping at regular intervals, with the forming platforms 565 positioned underneath different forming stations at each stop. At each forming station, a step is performed at the forming surface 600 to process the tubes and canister bases into canisters. As the canister bases are processed, they ride atop the forming surfaces 600 with their skirts hanging over the periphery of the forming surface rims 615. Since a different-sized canister base may be used when the canister size is to be changed, and since the canister bases must fit with their skirts closely about the forming surface rim 615, it is preferable that the forming supports 598 be quickly and easily replaceable. In the preferred embodiment of the invention, the forming support 598 is mounted on the top of the forming platform 565, with the surface stem 610 of the forming support 598 extending into a surface stem aperture 620 at the top of the forming platform 565 along its central axis. Screws extend through screw apertures 625 in the forming support 598 and firmly attach it to the forming platform 565. The periphery of the forming support 598 is provided with knurling 630 to enhance the strength of the weld between the tube and the canister base, a process that will be more fully explained below.

The forming supports 598 are constructed to allow canister bases to be held to them or pushed from them by the use of negative or positive air pressure. A supply orifice 635, through which negative (vacuum) or positive pressure may be supplied, is located at the center of the forming support 598. The surface plate 605 includes support shoulders 640, which support the canister bases and prevent the bases from sealing to the supply orifice 635 when vacuum is applied thereto. The supply orifice 635 extends through the forming support 598 and the central axis of the surface stem 610, as illustrated in phantom in FIG. 26. The vacuum (or positive pressure) is supplied to the supply orifice 635 from a vacuum passage 645, a passage which runs through the length of the platform stem 575, and which abuts the supply orifice 635 at the surface stem aperture 620. The end of the platform stem 575, which is located just beneath the operating platform 410, is equipped with an adapter 650 which allows different devices to connect to the end of the platform stem 575 at different forming stations. These devices may supply air or vacuum from the adapter 650 to the forming surface 600 through the vacuum passage 645, or they may utilize a ring of teeth 660 on the adapter 650 to supply torque to the platform stem 575 and thereby rotate the forming platform 565 (and forming support 598). There are two such devices: a pressure supply 663 and a rotary air supply 665. The forming stations that use either device will be specified in the following discussion of those forming stations.

Figure 30:
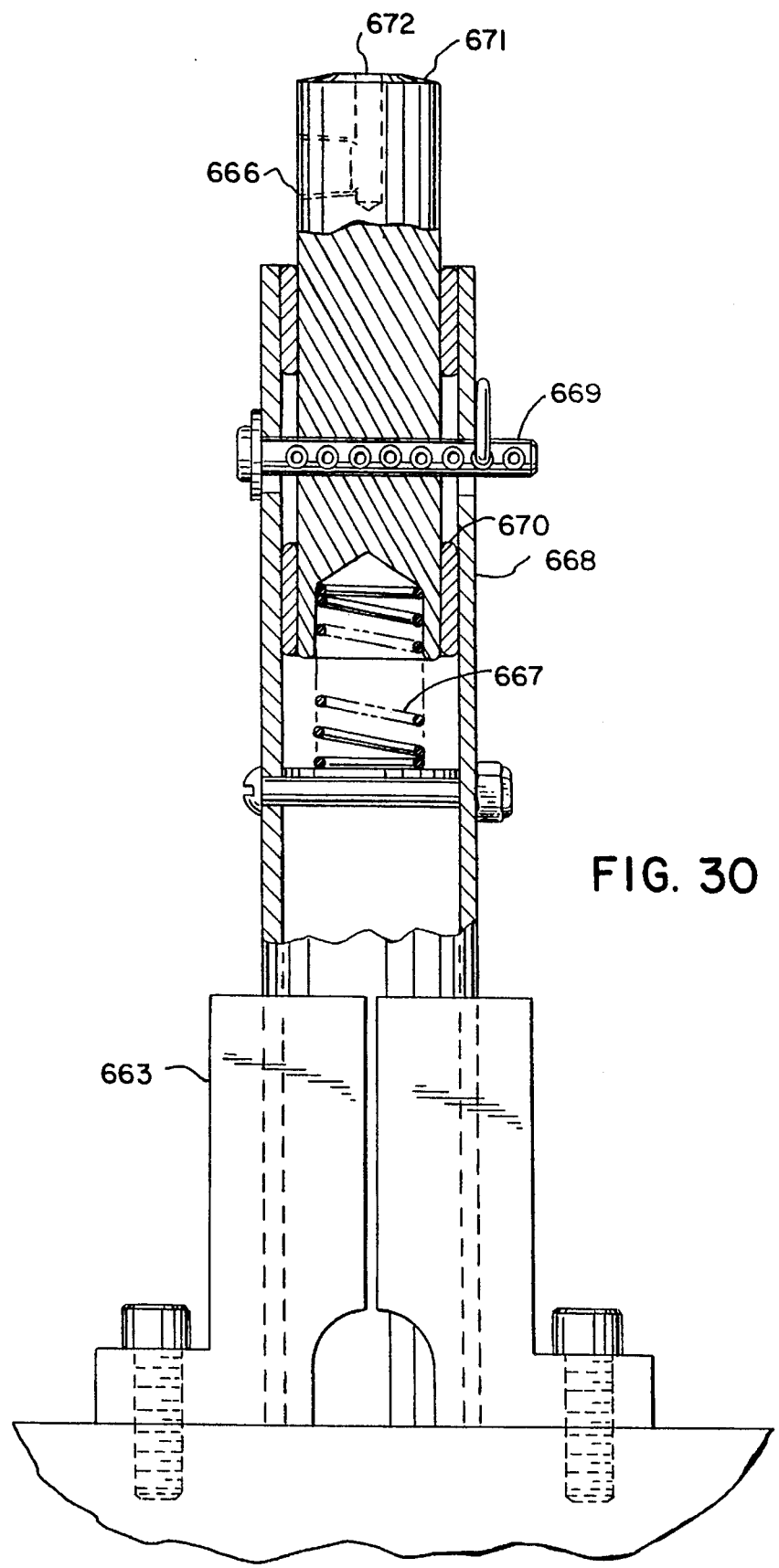
FIG. 30 is a side elevation view of a pressure supply unit.
Figure 34:
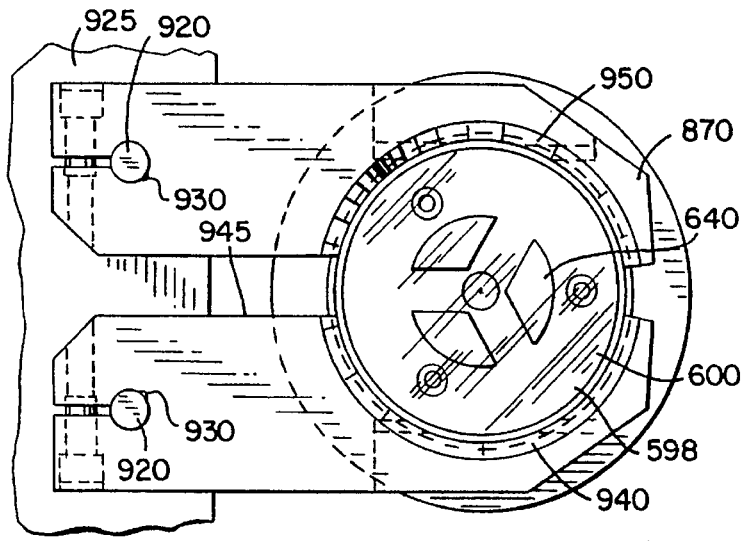
FIG. 34 is a plan view of the funnel pincers portion of the tube placement station.
Figure 35:
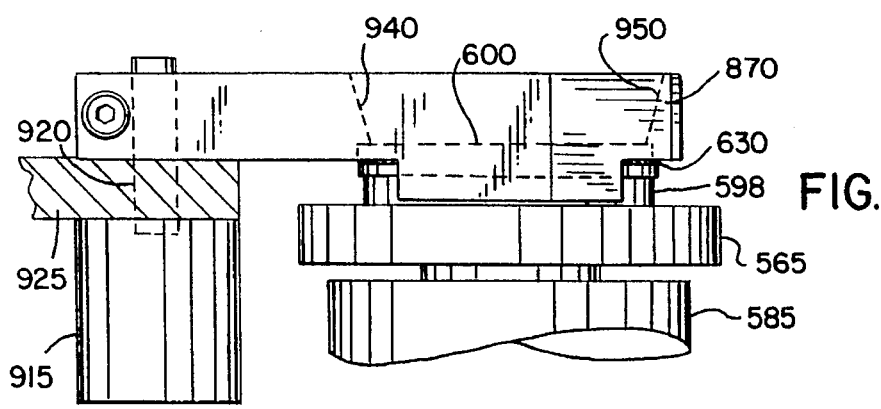
FIG. 35 is a side elevation view of the funnel pincers of FIG. 34.

Three forming stations utilize a pressure supply 663, which is shown in FIG. 30. Each pressure supply 663 rests beneath the operating platform 410 at the forming stations where an air or vacuum supply is desired at a forming surface 600. The pressure supply 663 comprises a supply shaft 666 which rests on a compression spring 667 within a sleeve 668. A shaft pin 669 mounted on the sleeve 668 rests within a slot 670 in the supply shaft 666 and allows the supply shaft 666 to reciprocate within the sleeve 668 within a limited range of motion. The top of the supply shaft 666 has a blunted end 671 and a shaft passage 672 through which vacuum or air pressure may be supplied. When the operating platform 410 rotates, certain forming platforms 565 will move into position over a pressure supply 663. The adapter 650 will move laterally into contact with the blunted end 671 of the supply shaft 666, forcing the supply shaft 666 downwardly into the sleeve 668 and compressing the compression spring 667. When the adapter 650 moves sufficiently far over the supply shaft 666 that the supply shaft 666 can fit within the ring of teeth 660, the compression spring 667 forces the supply shaft 666 upwardly so that the shaft passage 672 abuts the vacuum passage 645. Air or vacuum can then be supplied to the forming support 598 (and thus the forming surface 600) as desired. When a forming process is completed at a forming station, the operating platform 410 rotates and the teeth 660 on the adapter 650 force the supply shaft 666 downwardly, opposing the compression spring 667, so that the supply shaft 666 disengages.

Figures 26, 45:
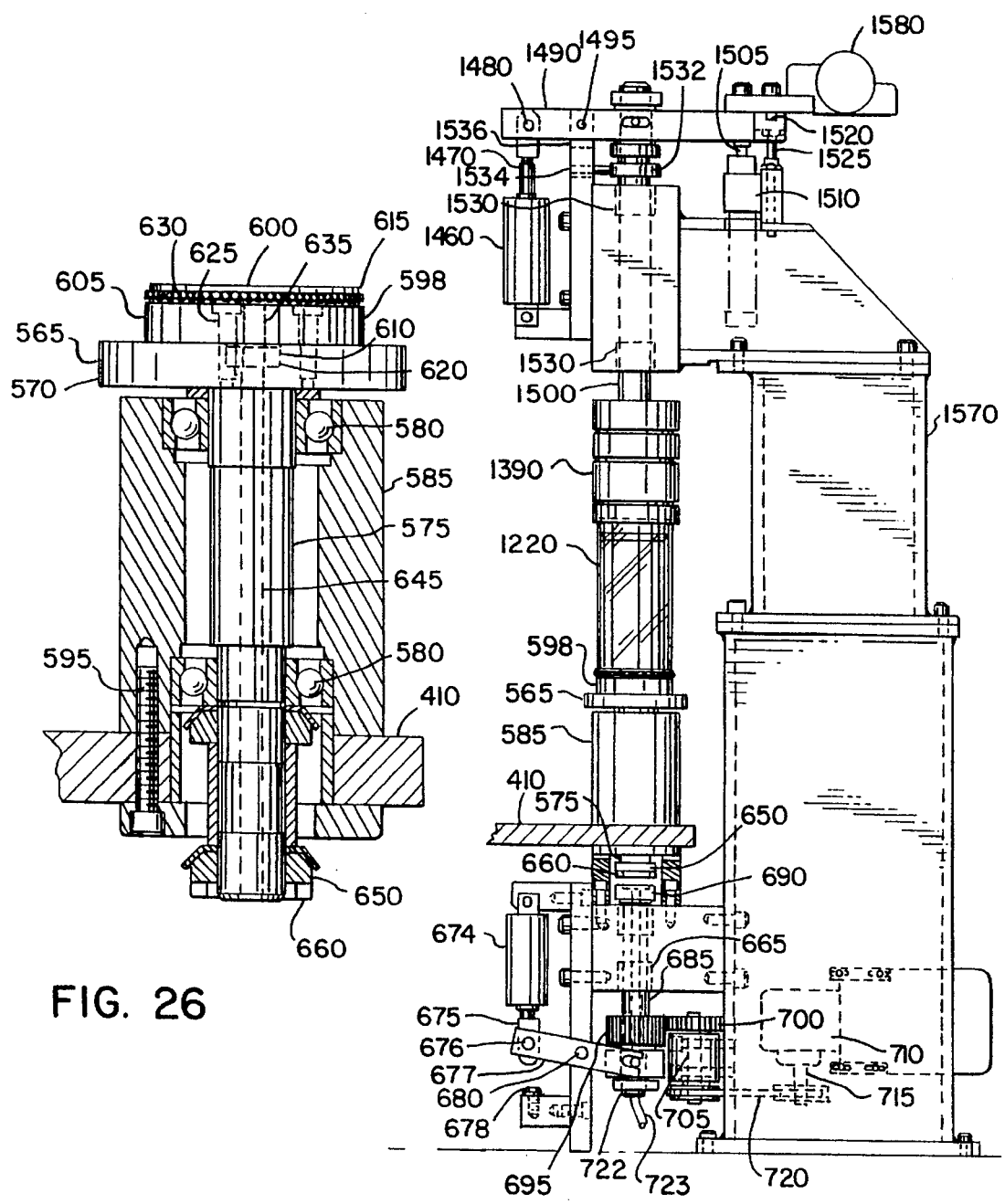
FIG. 26 is partial cross-sectional view of a forming station fixture.
FIG. 45 is a side elevation view of one of the final three lip-forming stations.

Four forming stations use a rotary air supply 665, which supplies vacuum to the forming support 598 located at such stations in order to retain canister bases on their operating platforms 410. A rotary air supply 665 is shown in its location beneath the operating platform in FIG. 45. The rotary air supply 665 supplies vacuum through the vacuum passage 645 to the supply orifice 635 of the forming support 598 which is stationed above it, and also supplies a driving force for rotating the forming platform 565 by engaging the teeth 660 at the bottom of the platform stem 575 and applying torque. FIG. 45 shows the rest position of the rotary air supply 665, when it is not supplying vacuum and torque. When vacuum and torque are to be supplied to a forming support 598, a supply air cylinder 674 is actuated, causing a supply air cylinder rod 675 to extend and push against a supply rod pin 676. The supply rod pin 676 in turn pushes a pivot arm 677 downwardly, causing it to pivot about a pivot point 680. This causes a supply shaft 685 to elevate until its toothed top end 690 engages the teeth 660 at the bottom of the platform stem 575. A supply shaft gear 695 remains engaged to a transmission gear 700, which is attached to a gear rod 705, even as the supply shaft 685 is elevated. When the drive rod of the supply air cylinder 674 moves sufficiently far downward, the teeth 660 are engaged by the toothed top end 690 of the supply shaft 685. A rotary air supply stop button 678 is adjusted for the proper backlash. A constantly rotating DC motor 710 (e.g., a K.B. Model KBMM125 DC gearmotor) can then transmit torque to the gear rod 705, and thus to the supply shaft 685 (and the forming platform 565 and forming support 598), through a shaft 715 and belt 720 arrangement. The end of the supply shaft 685 is equipped with a rotary hose coupling 722 to which a supply hose 723 may be attached. The supply hose 723 supplies vacuum to the forming support 598 (and the forming surface 600) through the supply shaft 685.

Figure 31:
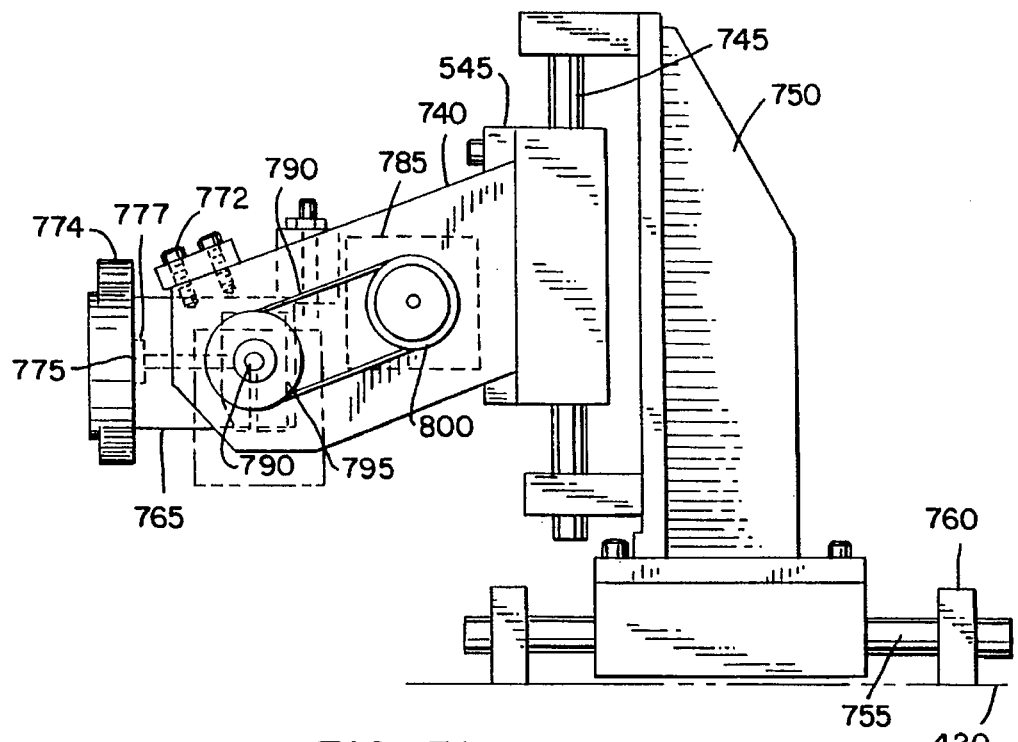
FIG. 31 is a side elevation view of the canister base loading arm.
Figure 31B:
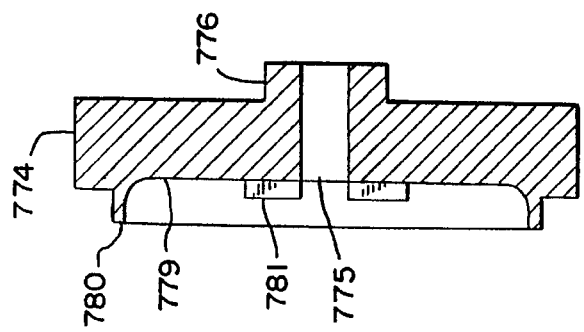
FIG. 31B is a cross-sectional view of the suction plate taken along the line 31B—31B of FIG. 31A.
Figure 31A:
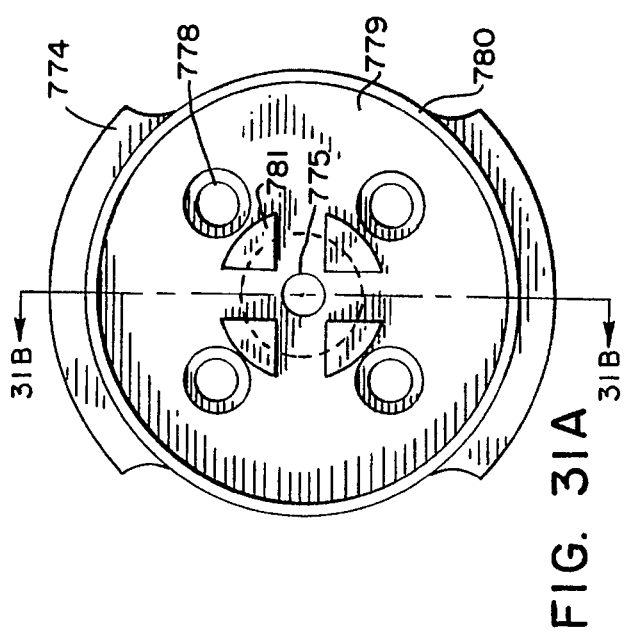
FIG. 31A is a top plan view of the suction plate of the canister base loading arm.
Figure 31C:
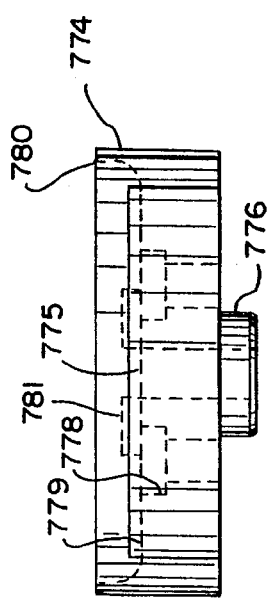
FIG. 31C is a side elevation view of the suction plate.
Figure 32:
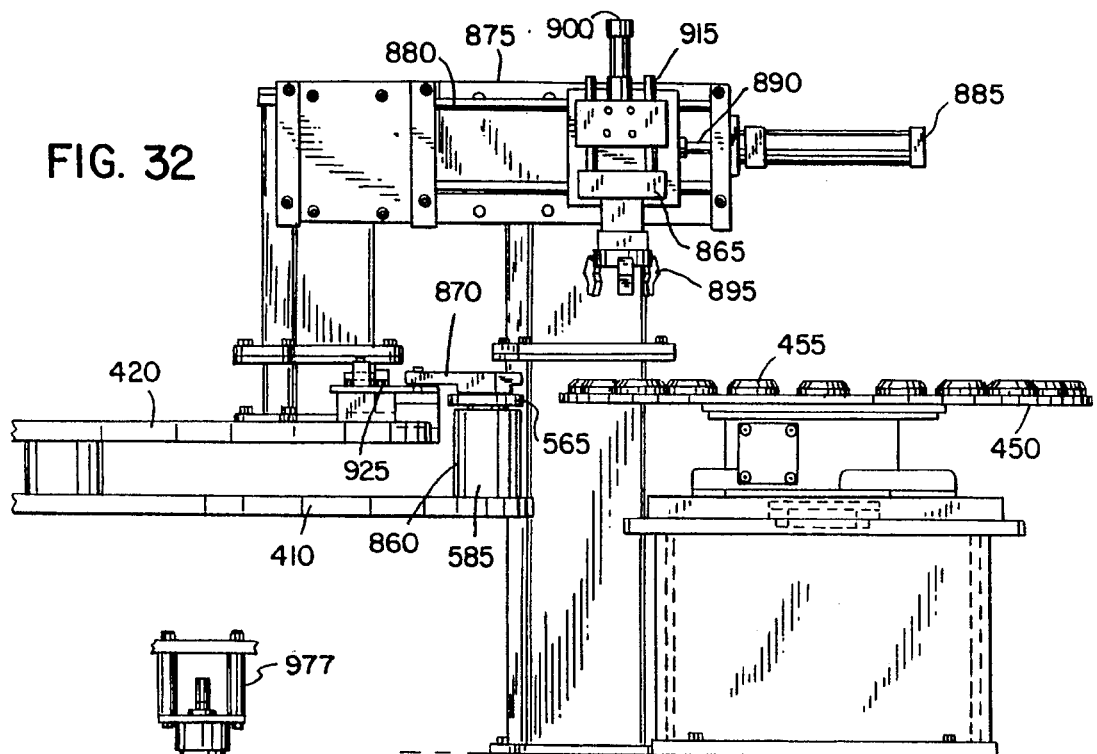
FIG. 32 is a side elevation view of the tube placement station and tube supply turntable.

The first forming station is the canister base placement station 735, the position of which is shown in FIGS. 19 and 20. A canister base loading arm 545, shown in greater detail in FIG. 31, removes a canister base from the canister base feeding magazine 440 and loads it onto the forming surface 600 of a forming support 598. The canister base loading arm 545 rests on a vertical slide 740, which may move vertically along a vertical track 745, and a horizontal slide 750, which may move horizontally along a horizontal track 755. Both the vertical and horizontal slides may be, e.g., PHD Model MT041-X2-I-M-V pneumatic slides. The horizontal track 755 is attached to the stationary platform 420 by arm anchors 760. At the end of the canister base loading arm 545 is a loading hand 765, which pivots about a pivot bearing 770. When the loading hand 765 is located in its horizontal position as shown in FIG. 31, it contacts a hand stop button 772. The loading hand 765 includes a suction plate 774, which has a suction orifice 775 connected to a vacuum supply. The suction plate 774 is shown in greater detail in FIGS. 31A–31C. The suction plate 774 includes a suction plate stem 776, as shown in FIGS. 31B and 31C, which is inserted into a loading hand stem aperture 777 on the loading hand 765. The suction plate 774 is then affixed to the loading hand 765 by means of screws threaded through the screw apertures 778. The suction plate face 779 is bounded by a raised face rim 780 and includes support columns 781, which prevent the canister bases from being pulled directly onto the suction orifice 775. The operating platform 410 turns so that a forming support 598 is located beneath the canister base loading arm 545, as illustrated in FIG. 19. As it does so, a pressure supply 663 engages the platform stem 575 so that vacuum may be supplied to the forming surface 600 when desired. The canister base loading arm 545 then moves outward along the horizontal track 755 towards the channel escapement 480 of the canister base feeding magazine 440. The canister base loading arm 545 stops when the loading hand 765 is positioned next to the channel escapement 480, with the suction plate 774 sitting adjacent to both the metering fingers 535 and the face of the canister base at the channel escapement 480. The vacuum is activated in the suction plate 774 and the metering fingers 535 are opened so that the canister base at the channel escapement 480 is securely affixed to the suction plate 774. The escapement fingers 515 then open, allowing the channel wedge 490 to push the canister base towards the channel escapement 480 and past the escapement fingers 515. The canister base loading arm 545 then begins to retract towards its original position on the horizontal track 755, carrying with it the canister base drawn to its suction plate 774. The moment this retraction begins, the escapement fingers 515 close to retain all canister bases within the channel 475 except the one drawn onto the suction plate 774. As the stroke continues, the canister base on the suction plate 774 encounters the metering fingers 535, rotating them about their pivots to their open position. After the canister base passes the metering fingers 535, they are returned to their closed position with air spring cylinders 540. After the canister base loading arm 545 has fully retracted to its original position, a pneumatic rotary actuator 785 is activated, turning the pneumatic rotary actuator axle 800. In the preferred embodiment, the pneumatic rotary actuator 785 is a Model LP-11-2V-SE Textron Rotary Actuator. A timing belt 790 and pulley 795 arrangement transmits the torque from the pneumatic rotary actuator axle 800 and rotates the loading hand 765 downwardly so that the suction plate 774 (and thus the canister base that it holds) lies parallel to the forming surface 600 on the forming support 598. The loading hand 765 is shown in this position in phantom on FIG. 31. The canister base loading arm 545 then moves down the vertical track 745 to a point where the suction plate 774 is located just above the forming surface 600. The vacuum supplied to the suction plate 774 is cut off, causing the canister base to drop onto the forming surface 600. The pressure supply 663 then activates and supplies a vacuum through the platform stem 575 to the forming surface 600 of the forming support 598 beneath it. The vacuum holds the canister base firmly down to the forming surface rim 615 (shown in FIGS. 27–29), and the support shoulders 640 limit inward deformation of the canister base. The canister base loading arm 545 retracts to its original position by moving up the vertical track 745. The pressure supply 663 is turned off and the operating platform 410 then revolves, moving the forming support 598 to the next forming station, a canister base seating station 815.

It is possible that the apparatus for making canisters may be modified several times during the course of a week to make canisters of different sizes or types. The surfaces of the canister bases may be intricately formed, with a number of ridges or protrusions, in order to produce a canister with a certain appearance or to produce a series of canisters with a desired stacking characteristic. If the canister bases have an extremely complex surface, it is possible that the canister base may not properly seat on the forming surface 600. For proper canister formation, the plane of the canister base should rest on the forming surface rim 615 with the depending skirt of the canister base descending over and laying in close relation to the periphery of the forming surface 600. Depending on their design, a batch of canister bases may be shaped such that their depending skirts fit too tightly on the knurling 630. Such canister bases may have their skirts either resting partially on and partially off of the knurling 630, or totally above the knurling 630 so that they do not fully rest on the forming surface rim 615. If this should happen, it is helpful to have a means of properly aligning the canister bases on the forming surface 600 so that the canisters are properly formed. A canister base seating station 815 may be provided to perform such alignment. At the canister base seating station 815, shown in FIGS. 19 and 20, a base seating plunger 820 descends onto the top of the canister base in a direction perpendicular to the forming surface 600 and pushes the canister base downwardly to insure that the depending skirt is properly positioned. The base seating plunger 820 comprises a circular plunger plate 825, attached to a plunger rod 830, which is driven upwardly and downwardly by a plunger air cylinder 835. The plunger air cylinder 835 is held upright and anchored to the stationary platform 420 by a plunger frame 840. The base seating plunger 820 pushes the canister base downwardly so that the entire skirt lays adjacent to the knurling 630. The plunger air cylinder 835, e.g., a Bimba Model 092 pneumatic cylinder, includes a speed controller which regulates the impact of the base seating plunger 820 as it contacts the canister base. After the canister base is pushed into position, the base seating plunger 820 moves upwardly to its rest position. The operating platform 410 then turns so that the forming support 598 is located at the next forming station, a tube placement station 860. The canister base seating station 815 may be omitted from the apparatus if the design of the canister bases is such that they are always properly seated on the forming surface 600. However, if the apparatus is to have a maximum amount of flexibility—whereby it can adapt and be adapted to manufacture an entirely different canister within a matter of minutes—the canister base seating station 815 is helpful to have in case a new style of canister base is found to have a design parameter which inhibits its proper seating. The canister base seating station 815 may be installed so that it is normally disabled, and so that it is only turned on for use when such irregular canister base designs are encountered.

Since the canister base seating station is intended to insure that a canister base is prepared to receive a tube, it is recommended that the station include a photoelectric switch which can check for the presence of a canister base. This is helpful because it can sense whether an error occurred whereby the apparatus failed to place a canister base on the forming surface 600, e.g., damaged or improperly oriented bases. The photoelectric switch can be made to shut down the entire apparatus, or preferably it will simply inhibit the equipment at the later forming stations for one cycle as the incomplete assembly moves toward the unload position. This will prevent the apparatus from attempting to form canisters on forming supports 598 where no bases are present, thereby possibly rendering any tubes used in such an attempt unusable and unfit for recycling when the canister bases are replaced. A low level switch (not shown) in the base load magazine may be utilized to turn the machine off and notify the operator when the supply of bases is low but not yet completely exhausted.

The tube placement station 860, shown in FIGS. 19, 20, 32, and 33, loads a tube onto a canister base by means of a tube supply arm 865 and a set of funnel pincers 870. A support structure 875 is suspended above both the operating platform 410 and the tube supply turntable 450. The support structure 875 supports a horizontal slide 880 (e.g., a PHD Model BS041X6M Pneumatic Power Slide) upon which the tube supply arm 865 is mounted. The tube supply arm 865 itself includes a vertical slide 900 (e.g., a PHD Model TS031X1-AJ2-R2 Pneumatic Power Slide) upon which a set of gripper fingers 895 are mounted. These gripper fingers 895 (e.g., PHD Model 8624-01-0001 3-Jaw Pneumatic Angular Grippers) may grip objects by expanding and contracting in a radial direction. During the canister base alignment operation, the horizontal slide 880 locates the tube supply arm 865 above a tube on a tube supply mandrel 455. The vertical slide 900 moves the tube supply arm 865 downwardly so that the gripper fingers 895 extend within the inner cavity of the tube. The gripper fingers 895 spread outwardly, contacting the tube in a radial direction on its inner sidewall and thereby gripping the tube firmly from its inside. The vertical slide 900 then moves the tube supply arm 865 upwardly, picking the tube up off the tube supply mandrel 455. After the tube supply arm 865 has been fully elevated, the horizontal slide 880 moves it until the tube is located over the forming surface 600 of the forming support 598.

A set of funnel pincers 870 is mounted at the tube placement station 860 between the canister base on the forming surface 600 and the tube being held by the tube supply arm 865 above it. These are shown in further detail in FIGS. 34 and 35. The funnel pincers 870 are jaws which pivot about rotary actuator shafts 920, with the jaws opening in a manner similar to those of scissors. Pneumatic rotary actuators 915, which drive the rotary actuator shafts 920 to open and close the funnel pincers 870, are attached to the jaw mount 925. The jaw mount 925 is in turn attached to the stationary platform 420. Each jaw of the funnel pincers 870 is located on a rotary actuator shaft 920 and retained in position by a key 930. A tapered semicircular depression 940 is located on the inner surfaces 945 of the jaws so that, when the jaws are closed, they form a frustoconical aperture extending between the jaws. This aperture forms a funnel 950 which directs a tube presented by the tube supply arm 865 from above the funnel pincers 870 into alignment with a canister base held on the forming surface 600 of the forming support 598. The jaw mount 925 for the funnel pincers 870 is built so that the funnel pincers 870 may be replaced by funnel pincers 870 having a differently-sized funnel 950 if the tube diameter (and thus the canister base diameter) is to be significantly changed. The funnel pincers 870 may also be replaced by funnel pincers 870 with a non-circular funnel 950 aperture, e.g. an elliptical funnel 950 aperture, in order to produce canisters with non-circular cross-sections. For example, if the tubes (with generally circular cross-section) were inserted into an elliptical funnel 950 aperture so that they were directed onto elliptical canister bases riding atop elliptical forming surfaces 600, a canister with an elliptical cross-section might be made. After the tube supply arm 865 locates the tube over the forming surface 600, the vertical air cylinder 900 lowers the tube supply arm 865 to introduce a tube into the funnel 950. The funnel 950 directs the tube onto the canister base on the forming surface 600 so that the canister base fits within the inner cavity of the tube, with the depending skirt on the canister base at the tube's bottom edge. After the tube is in place on the canister base, the gripper fingers 895 move inwardly, releasing the tube. The vertical air cylinder 900 then raises the tube supply arm 865 and the pneumatic rotary actuators 915 open the funnel pincers 870 wide enough that the operating platform 410 may turn without the jaws striking the tube and dislodging it from the canister base and/or the forming support 598. The operating platform 410 then rotates to move the forming platform 565 having the tube and canister base supported on it to the next forming station, the tube seating station 960.

Figure 33A:
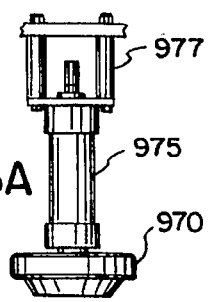
FIG. 33A is a side elevation view of the tube seating plunger taken along the line 33A—33A in FIG. 33.
Figure 33:
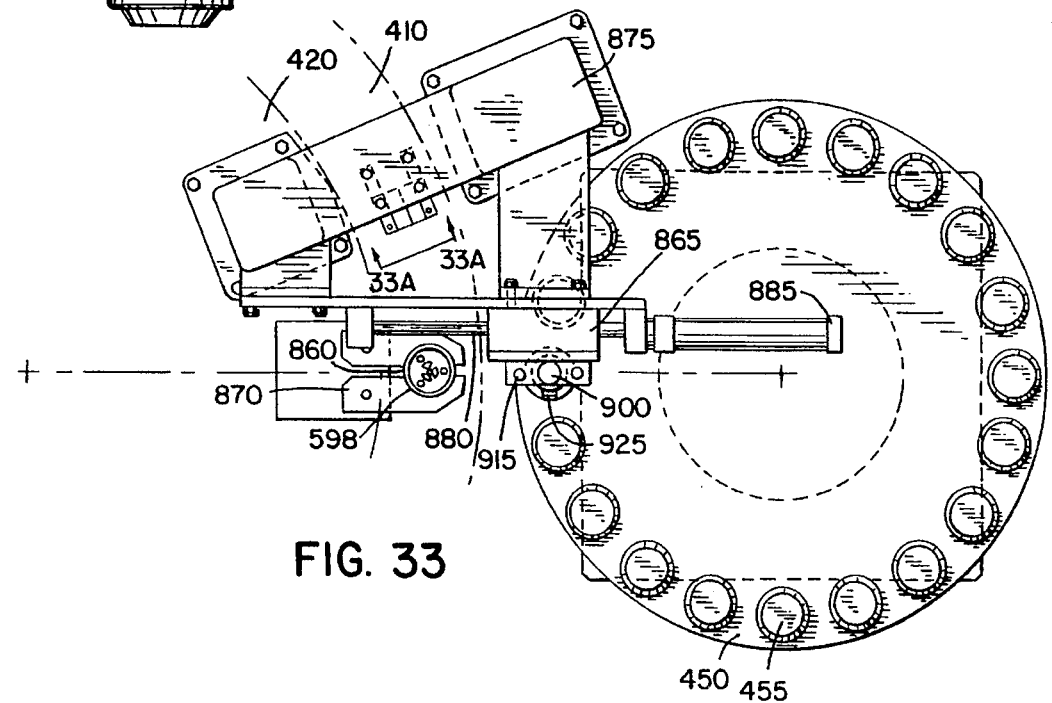
FIG. 33 is a top plan view of the tube placement station and tube supply turntable.
Figure 36:
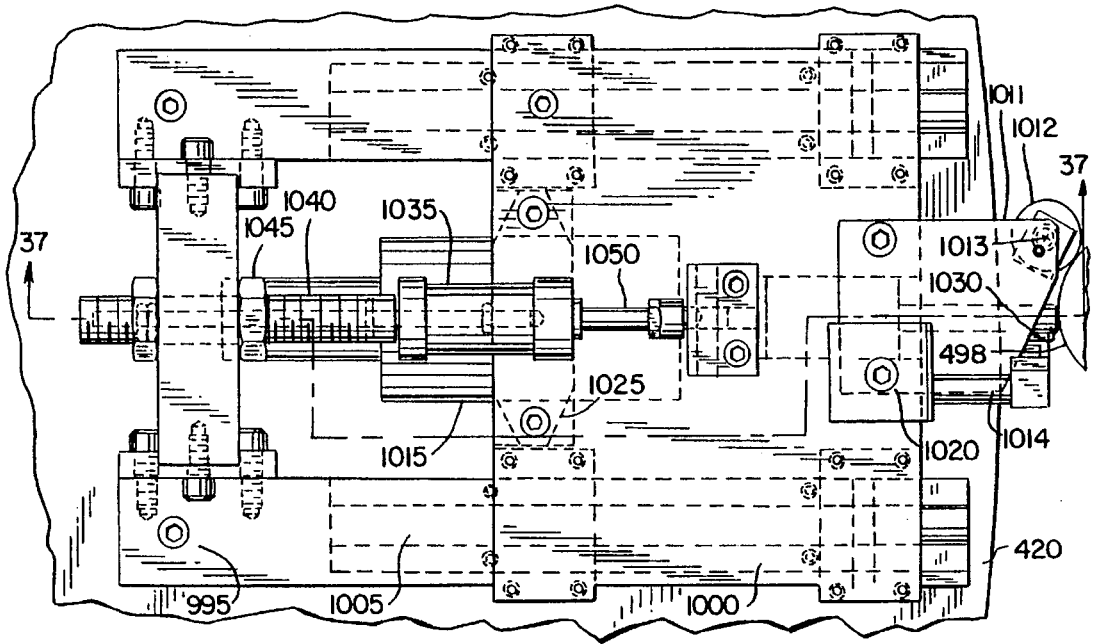
FIG. 36 is a top plan view of the ultrasonic welder at the welding station.

At the tube seating station 960, a tube seating plunger 970 (shown in FIG. 33A from the line 33A—33A in FIG. 33)

descends in the direction of the axis of the tube and contacts the top of the tube, pushing it downwardly. The design of the tube seating plunger 970 is similar to that of the base seating plunger 820 at the canister base seating station 815. The tube seating plunger 970 pushes the tube firmly onto the canister base, insuring that the tube's bottom edge is parallel to the plane of the canister base. The tube seating plunger 970 may be driven by a tube seating air cylinder 975, e.g., a PHD Model DAVCF air cylinder whose action is constrained by a speed controller. The speed controller insures that the tube seating plunger 970 makes proper contact to seat the tube without crushing it. Spacers 977 of different sizes may be used to raise or lower the tube seating plunger 970.

It is helpful if the tube seating station 960 has means whereby it can check for the presence of a tube, so that it may inhibit operations at the later forming stations for one cycle as the incomplete assembly moves toward the unload position (or it may simply shut down the apparatus). This may be accomplished by providing an aperture in the tube seating plunger 970 through which air may be introduced into the tube, allowing a back pressure reading to indicate whether a tube is present and properly seated or not.

After the tube seating operation is complete, the tube seating plunger 970 retracts. The operating platform 410, with the forming support 598 atop it, then indexes the forming platform 565 by rotary action to the next forming station (which may be an idle station, as shown in FIG. 19). One or more such idle stations may be used where no operations take place. One purpose of the idle stations is simply to allow sufficient room adjacent the operating platform 410 for the apparatus of the various operating stations. Idle stations also provide access to end tooling as canister styles change and for preventative maintenance. It is understood that operations at each of the stations are carried out simultaneously, with the operating platform 410 dwelling at each indexed position long enough for each of these operations to be completed.

Figure 37:
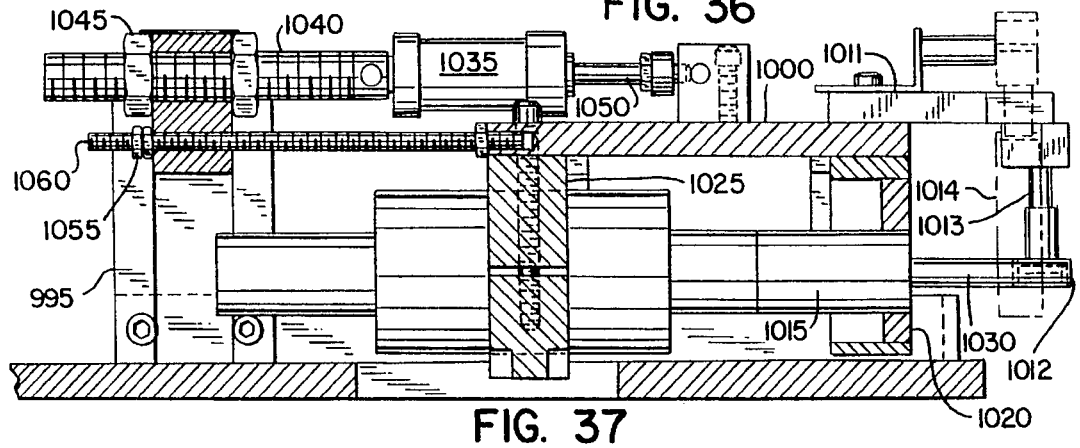
FIG. 37 is a side elevation view of the ultrasonic welder of FIG. 36.

At the welding station 985, shown in FIG. 19, the canister base is welded to the tube. A rotary air supply 665 rests beneath the operating platform 410. A welding apparatus 990, which is shown in greater detail in FIGS. 36 through 38, rests atop the stationary platform 420. FIG. 37 shows a cross-section view of the welding apparatus 990 along the section line 37—37 of FIG. 36. The welding apparatus 990 includes a welder base 995, which is attached to the stationary platform 420, and a sliding mount 1000. The welder base 995 contains a pair of parallel welder rails 1005. The sliding mount 1000 has two pairs of pillow blocks 1010 which slide across the welder rails 1005, allowing the sliding mount 1000 to approach the forming surface 600. A leading plate 1011 sits atop the sliding mount 1000, with a knurled contact roller 1012 sitting below the leading plate 1011 and attached to the leading plate 1011 by a central roller pin 1013 so that it may rotate. The knurled contact roller is shown in greater detail in FIGS. 36A and 36B. Also attached to the leading plate 1011 is a guide rod 1014, which extends downwardly from the leading plate 1011 opposite the knurled contact roller 1012. An ultrasonic welder 1015 is attached to the underside of the sliding mount 1000 by a front bracket 1020 and a rear bracket 1025, with the front bracket 1020 supporting the ultrasonic welder 1015 near its welding head 1030. The preferred embodiment of the invention uses, e.g., a Branson ultrasonic welder with a frequency of 20 KHz. A welder air cylinder 1035 is attached to a threaded shaft 1040, which is affixed with respect to a stop block 1042 on the welder base 995 by means of holding nuts 1045. In the preferred embodiment, the welder air cylinder 1035 is a PHD Model #AVP Air Cylinder with a built-in speed controller. The piston rod 1050 of the welder air cylinder 1035 is connected to the sliding mount 1000. When the welder air cylinder 1035 is actuated, it pushes the sliding mount 1000, and thus the ultrasonic welder 1015, along the welder rails 1005 in the direction of the canister base 495 supported on the forming surface 600 of the forming support 598. The motion of the sliding mount 1000 is limited by (1) the position of the holding nuts 1045 on the threaded shaft 1040, and (2) the position of the stop nuts 1055 on the stop shaft 1060, which may slide through the stop block 1042 as far as the stop nuts 1055 permit. Therefore, the final position of the welder head 1030 may be modified if the size of the canister bases, and thus the size of the forming support 598, should be changed. First, coarse adjustments may be made by repositioning the threaded shaft 1040 with respect to the stop block 1042 by repositioning the holding nuts 1045. This changes the position of the welder air cylinder 1035 and thereby affects travel. Fine adjustments may be made by moving the stop nuts 1055 on the stop shaft 1060, limiting the stroke of the welder air cylinder 1035. The forward travel of the ultrasonic welder 1015 may thus be modified in two ways to adapt to any size of forming support 598 that may be used.

Figure 39:
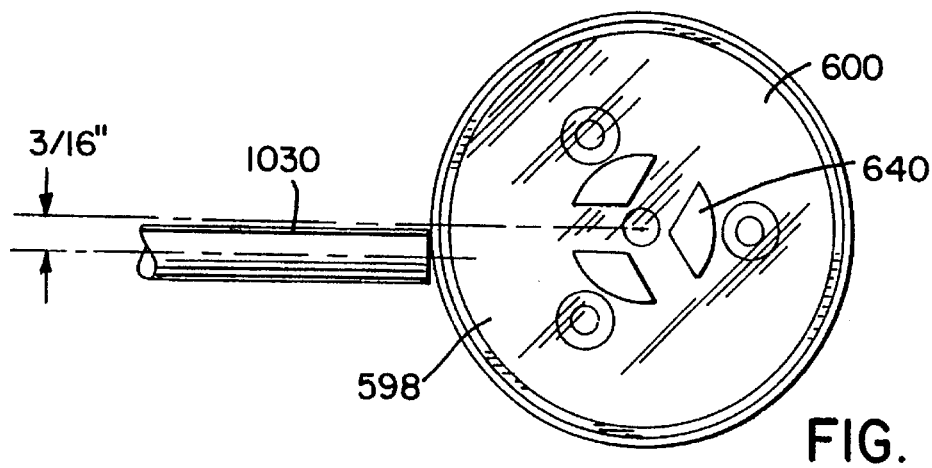
FIG. 39 is a simplified schematic view of the orientation of the welding head of the ultrasonic welder as it comes into contact with the canister base on the canister forming support.
Figure 36C:
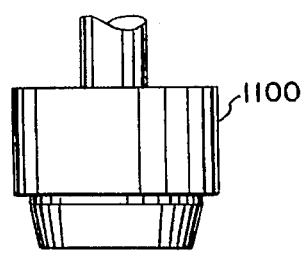
FIG. 36C is an elevational view of the conical holding plunger.
Figure 38:
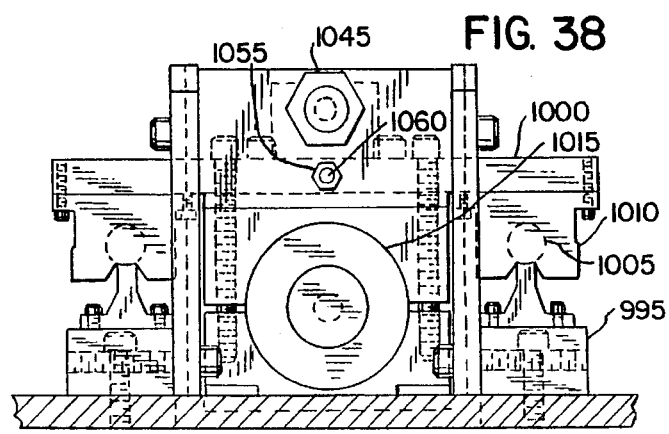
FIG. 38 is a rear elevation view of the ultrasonic welder of FIG. 36.
Figure 39A:
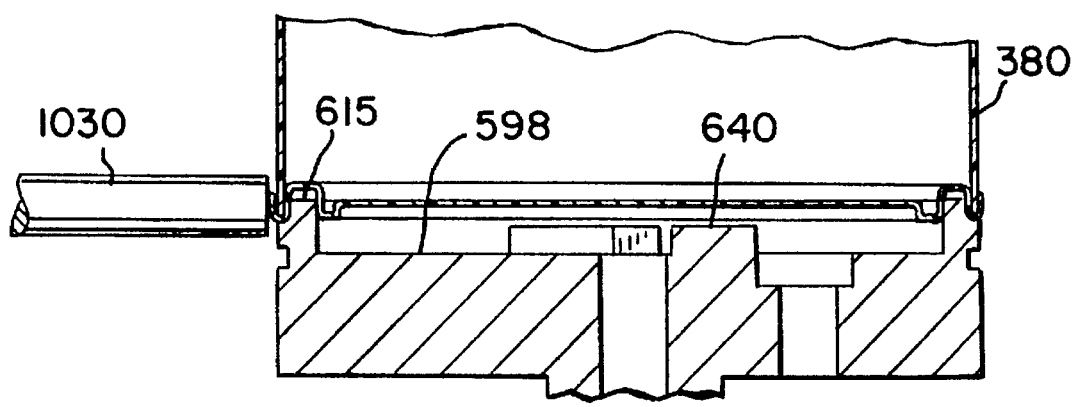
FIG. 39A is a cross-sectional view of the canister forming support of FIG. 39 shown with the welding head of the ultrasonic welder.

When the forming support 598 with a tube and canister base supported thereon is at the welding station 985, a conical holding plunger 1100, illustrated in FIG. 36C, extends downwardly in the direction of the axis of the tube 380. As shown in FIG. 19, the tip of the holding plunger 1100 extends within the inner cavity of the tube until its surface engages the top edge of the tube, holding the tube down on the forming surface 600. The holding plunger is driven by, e.g., a PHD Model DAVCF air cylinder with a built-in speed controller, which prevents the holding plunger 1100 from descending too quickly and damaging the tube. The welder air cylinder 1035 then advances the ultrasonic welder 1015 so that its welding head 1030 moves into position adjacent to the bottom of the tube and the skirt on the canister base. The bottom of the tube and the skirt on the canister base are thus sitting between the welding head 1030 and the knurled surface 630 on the periphery of the forming support 598, as best shown in the cross-sectional view of FIG. 39A. At the same time the welding head 1030 moves adjacent to the knurled surface 630, the knurled contact roller 1012 pinches the tube and canister base between the knurling 630 on the forming support 598 and the roller knurling 1105 on the knurled contact roller 1012. The guide rod 1014 abuts the forming support 598 and the canister base, lying parallel to the tube wall. The rotary air supply 665 is then engaged, simultaneously supplying torque to rotate the forming support 598, and vacuum to hold the canister base down to the forming surface 600. As the forming support 598 rotates about its axis, the ultrasonic welder 1015 is advanced into engagement with the skirt of the canister base to join the canister base to the tube. As shown in FIG. 39, the welding head 1030 is aligned so that its axis is at an angle to a radius of the tube. Directed in this manner, as the forming support 598 rotates, the welding head 1030 contacts the plastic of the tube at a point slightly behind where it would contact the plastic if aligned radially. The welding head 1030 is aligned at an angle to a tube radius, rather than coincidentally, because the welding process tends to cause the plastic on the skirt and tube to deform and pile up in front of the welding head 1030 when the welding head 1030 is coincidentally aligned. It has also been found that if ultrasonic welding is to be used rather than thermal welding, a better weld is obtained if the periphery of the forming support 598 is rough, rather than smooth; hence, the knurling 630. As the forming support 598 rotates, the roller knurling 1105 on the knurled contact roller 1012 contacts the still-soft tube plastic after the welding head 1030 welds it, thereby adding an external knurl to the tube. After a full revolution of the forming support 598, the welding power is turned off. Welding may be continued for a greater number of revolutions to obtain better results depending on the type of plastic used and its dimensions. Rotation of the forming support 598 may continue for a second revolution as the roller knurling 1105 on the knurled contact roller 1012 presses on the softened seam to complete the weld. The ultrasonic welder 1015 and the conical holding plunger 1100 are then retracted. At this point, the canister comprises a cylindrical sidewall bounding an inner cavity with a top edge at the top of the sidewall and a canister base attached to the bottom of the sidewall. The operating platform 410 then indexes a partial revolution and moves the forming support 598 with a canister thereon to lip forming stations, where a lip-forming process is used to form a top lip on the canister.

The ultimate object of the lip-forming process is to form a complete lip on the top edge of the canister, with the top edge bent over on itself. There are preferably five lip forming stations. First and second lip forming stations are shown in FIG. 19 at 1200 and 1210, respectively; these two lip forming stations are each as shown in FIG. 40. The last three lip forming stations are shown on FIG. 19 at 1220, 1230, and 1240, and these three lip forming stations are each as shown in FIG. 45. None of the lip forming stations are shown in their entirety in FIG. 19. The first two lip forming stations use heated plungers to soften and bend the top edge of the canister outwardly at a 45 degree angle. Approximately one-eighth inch of the top edge is so bent. The third, fourth and fifth lip forming stations then each use a heated plunger to bend this portion of the top edge of the canister double so that it lays next to the canister sidewall, completing the lip. Each lip forming station uses a vacuum (supplied from the supply orifice 635 on the forming surface 600) to hold the canister onto the forming surface 600 so that the heated and soft plastic at the top of each canister, which may stick to the heated plunger, does not adhere to the heated plunger and cause the heated plunger to pull the canister off of the forming surfaces 600 when it withdraws. Five lip forming stations are preferably used, in part because the lip, in its final form, would take too long to form at one forming station and require too long a dwell, slowing down the entire canister-forming process. At all lip forming stations, the heated plungers are removable and replaceable so that a lip can be added to a canister with a different diameter by replacing the heated plunger with a new one that accommodates the new tube diameter. All lip-forming stations may use, e.g., an Ogden ETR-9090 Temperature Control to regulate the temperature in the heated plungers.

The first step in the lip forming process begins when the operating platform 410 carries the canister under the first lip forming station 1200. At this point, the canister is located as shown in FIGS. 19 and 40. The first forming air cylinder 1250, which drives a first piston rod 1260, is attached at one end to several spacer blocks 1265, which are in turn attached to a support structure 1270. In the preferred embodiment of the invention, the first forming air cylinder 1250 is, e.g., a PHD Model DAVCF Air Cylinder with built-in speed control. The first piston rod 1260 is threaded so that a first heated plunger 1280 may be screwed on. The first forming air cylinder 1250 uses the first piston rod 1260 to drive a first heated plunger 1280 downwardly so that it contacts the top edge of the cylinder, or upwardly to its resting position. A pressure supply 663 supplies vacuum to the supply orifice 635 of the forming surface 600, pulling the canister firmly onto the forming surface 600 so that the canister will not be pulled off of the forming surface 600 when the first heated plunger 1280 withdraws. The first heated plunger 1280 is shown in greater detail in FIG. 41, which shows an elevation view of the first heated plunger 1280, and in FIG. 42, which shows a plan view from the first plunger face 1290. The first heated plunger 1280 preferably comprises several layers of different materials which are assembled to complete the plunger. A first heating layer 1300, shown in the plan view of FIG. 42, is made of aluminum and contains electrical resistance heaters 1302 which provide the heat to soften the top edge of the canister. Thermocouples 1304 may be inserted within the first heating layer 1300 to monitor its temperature. A first finishing layer 1310 is made of aluminum with a Dura-Kote "N-F" finish (hard-surfaced and teflon-coated) provided by Universal Metal Finishing of Chicago, Ill. The first finishing layer 1310, as shown in the plan view of FIG. 42B, contacts the canister at its beveled surface 1315. It receives the heat from the first heating layer 1300 and is maintained at a temperature adequate to soften the plastic canister stock. When the first heated plunger 1280 descends atop the canister, the beveled surface 1315 of the first finishing layer 1310 preferably meets the top edge of the canister at a 45-degree angle. A first face layer 1320, which extends within the inner walls of the canister when the first heated plunger 1280 descends deeper within the canister, is made of nylon to minimize heat transfer from the first finishing layer 1310. The first face layer 1320 includes a venting aperture 1345 which extends from the first plunger face 1290, through the first face layer 1320, and into the first finishing layer 1310 and out of its side. This venting aperture 1345 insures that the air pressure inside the canister will be at atmospheric pressure when the first heated plunger 1280 descends atop the top edge of the canister and heats it, thereby preventing the tube from bursting. A first tail insulating layer 1350 (shown in the plan view of FIG. 42C) is made of teflon to limit heat transfer from the first heating layer 1300, and a first tail layer 1360 (shown in the plan view of FIG. 42D) is made of aluminum.

When the first forming air cylinder 1250 is actuated, the first heated plunger 1280 descends atop the top edge of the canister and the beveled surface 1315 of the first finishing layer 1310 contacts the top edge of the canister, softening and bending it radially outwardly at a 45 degree angle. The first forming air cylinder 1250 is set with a stroke length that will drive the first heated plunger 1280 up to one-eighth of an inch into the top edge of the canister; however, unless the plastic used for the canister sidewalls is very thin, it is unlikely that the top edge of the canister will be softened enough to bend the full one-eighth inch of the top edge. The second lip forming station 1210 is therefore used to complete the initial 45-degree bend in the upper one-eighth inch of the top edge of the canister. The first heated plunger 1280 withdraws, and the operating platform 410 advances the canister atop the forming support 598 to the second lip forming station 1210 so that the lip can be further completed.

The second lip forming station 1210 is identical to the first lip forming station 1200, and it performs the same process, but it plunges slightly deeper into the top edge of the canister. A second heated plunger 1370 is identical to the first heated plunger 1280, which is shown in FIGS. 41 and 42. A second forming air cylinder 1380 drives the second heated plunger 1370 into the top edge of the canister. The second lip forming station 1210 repeats the process performed at the first lip forming station 1200. When the second heated plunger 1370 withdraws, the uppermost one-eighth inch of the top edge of the canister is bent at a 45 degree angle outward from the sidewalls of the canister. After the second heated plunger 1370 withdraws, the operating platform 410 advances the canister atop the forming support 598 to the third lip forming station 1220.

The final three lip-forming stations complete the lip by curling the top one-eighth inch of the canister over so that it lays parallel to the sidewalls of the canister. The structure of the third lip forming station 1220, and also of the fourth lip forming station 1230 and the fifth lip forming station 1240 as well, is shown in FIG. 45. The heated plunger 1390 for the third lip forming station, (and, in similar fashion, the heated plungers for the fourth and fifth stations) is shown in FIGS. 43–44. These heated plungers are slightly different from those of the first two lip-forming stations. A third tail insulating layer 1400 and a third heating layer 1420 are identical to the corresponding layers in the first heated plunger 1280 and the second heated plunger 1370. A third tail layer 1410 is similar to the corresponding layer in the first heated plunger 1280 and the second heated plunger 1370, but is slightly thicker. The third face layer 1430 and third finishing layer 1440 include a venting aperture 1445 similar to the ones in the first and second heated plungers 1280 and 1370. The intermediate face 1450 includes a circular forming groove 1455, which has the same diameter as the canister; this will be used to curl the bent region at the top edge of the canister into a lip. After it is assembled, the third tail layer 1410 is clamped onto the end of the third plunger shaft 1500.

The curl begins when a press cylinder 1460, a PHD Model AVP, extends a piston rod 1470 upwardly. The piston rod 1470 pushes a press pin 1480 upwardly, and this in turn pivots a press bar 1490 about the pivot point 1495. The press bar 1490 acts against a third plunger shaft 1500, pushing it downwardly, simultaneously pushing the extended rod 1505 of a speed controller 1510 (e.g. an Enicheck HSC 150 speed controller) downwardly. The speed controller 1510 is used to govern the speed of the third heated plunger 1390 so that it does not push down too quickly and crush the canister. When the press bar 1490 moves far downwardly by a desired distance, a stop button 1520 at its end contacts a threaded stud 1525 and thereby halts the action of the press cylinder 1460. By screwing or unscrewing the threaded stud 1525, the stop button 1520 is contacted later or earlier as the press bar 1490 moves, and the stroke of the third plunger shaft 1500 may be altered. As shown in FIG. 45, the third lip forming station 1220 is also equipped with a rotary air supply 665. As the heated plunger 1390 descends atop the canister, the rotary air supply 665 may be activated to supply torque to the platform stem 575, and thus to the forming support 598 and the canister as well. Rotation of the forming support 598 can help to form a very uniform lip, but generally the lip is sufficiently uniform that rotation is not necessary. Hence, rotation is optional, and is recommended only for canisters with very large diameters which are more likely to have irregularities on their circumferences. To activate the rotation, the supply air cylinder 674 is extended, thereby engaging the toothed top end 690 with the teeth 660 at the bottom of the platform stem 575 so that the continuously rotating DC motor 710 imparts rotary motion to the forming support 598. The press bar 1490 pushes the plunger shaft 1500 downwardly so that the heated plunger 1390 contacts the top edge of the canister (which is bent outward at a 45-degree angle) on its intermediate face 1450. The plunger shaft 1500 rests within a pair of bearing sleeves 1530. A collar 1532 on the third plunger shaft 1500 holds a restraining pin 1534 which extends horizontally into a slot in the mounting plate 1536. The restraining pin 1534 allows the plunger shaft 1500 to move axially but prevents its rotation within the bearing sleeves 1530. As the third heated plunger 1390 further bends the lip, the rotation of the canister (if provided) insures that the lip will be evenly formed across the entire circumference of the top edge of the canister. The intermediate face 1450 pushes against the bent region at the top edge of the canister, softening it and bending it outward from the remainder of the canister sidewall. When the third heated plunger 1390 withdraws, the uppermost one-eighth inch of the top edge of the canister is bent at a 45 degree angle outward from the sidewalls of the canister. After the third heated plunger 1390 withdraws, the operating platform 410 advances the canister atop the forming support 598 to the fourth lip forming station 1230.

A vibrator 1580 is preferably mounted to the top structure of the last three lip forming stations and runs continuously to transmit vibrations down the shaft 1500 to the plunger 1390. The use of the vibrator 1580 (e.g., a Vibrolator model BD, size 13, made by Martin Engineering) eliminates any tendency of the soft heated end of the tube from adhering to the plunger.

At the fourth lip forming station 1230 and at the fifth lip forming station 1240, the process is repeated so that the lip is bent until it lies adjacent to the remainder of the sidewall. As the fourth heated plunger 1540 of the fourth lip forming station 1230 descends atop the top edge of the canister, the intermediate face 1450 contacts the region on the top edge of the canister that was bent at the third lip forming station 1220. The intermediate face 1450 softens and bends this region, pushing it further downward as the heated plunger 1390 descends. Eventually, the fold region between the cylindrical region on the canister sidewall and the outwardly-bent region at the top edge of the canister is forced into the forming groove 1455, and the outwardly-bent plastic begins to fold over atop the top edge of the canister. As this occurs, the rotary air supply 665 can, if desired, supply torque (with the vacuum supply activated) to the forming support 598, causing the canister to rotate. The forming groove 1455 will force the bent region on the top edge of the canister to curl outward until it lies adjacent to the canister sidewall. The forming groove 1455 has a radius of approximately $\frac{3}{32}$ inch, a width sufficient to accommodate bends in most canister sidewall thicknesses; however, the radius of the forming groove 1455 may be changed in order to accommodate canisters with thicker sidewalls. The fourth heated plunger 1540 then withdraws, the operating platform 410 advances the forming support 598 to the fifth lip forming station 1240, and the process of the fourth lip forming station 1230 is repeated.

The fifth heated plunger 1550 at the fifth lip forming station 1240 bends the outwardly-bent plastic at the top edge of the canister over further, forming a fully curled plastic lip at the top edge of the canister. This is done by a forming groove 1455 located on the fifth heated plunger 1550 which has a radius of approximately $\frac{3}{64}$ inch. The temperature of the fifth heated plunger 1550 is lower than that of the previous heated plungers 1540, 1390, 1370, and 1280 in order to cool the plastic enough to "set" it in its final position, e.g. 160 degrees fahrenheit as opposed to 240–290 degrees. Without a significant decrease in the temperature of the fifth heated plunger 1550, the lip tends to open up as the plastic cools and contracts, making it difficult to fix the form of the lip. When the fifth heated plunger 1550 withdraws from the top edge of the canister, the uppermost one-eighth inch of the top edge of the canister has been bent double and formed into a completed curled lip. The operating platform 410 then carries the finished canister to the tube rounding station 1620.

The lip-forming stations are designed so that they may be rapidly altered to accommodate canisters with different heights and diameters. The first piston rod 1260 is threaded so that the first heated plunger 1280 may be screwed onto it, and the second heated plunger 1370 is similarly affixed at the second lip forming station 1210. These heated plungers 1280 and 1370 may be unscrewed and replaced with a differently-sized heated plunger to adapt to different canister heights and diameters. The heated plungers 1280 and 1370 may also be adapted to minor canister height changes by screwing or unscrewing them so that they rest further up or down the piston rod. At the first lip forming station 1200 and second lip-forming station 1210, the spacer blocks 1265 may be added or removed to accommodate for greater height changes. The third, fourth, and fifth heated plungers 1390, 1540, and 1550 are clamped to the plunger shafts at the third, fourth, and fifth lip forming stations 1220, 1230, and 1240, and may be unclamped and repositioned so that they rest further up or down the plunger shafts. At the stop button 1520, the threaded stud 1525 may be screwed or unscrewed to allow for greater or lesser ranges of motion of the heated plungers and thereby compensate for canister height changes. At these final three stations, major canister height changes may also be accommodated by changing the height of the riser 1570.

The lip-forming process described above is used to form a lip at the top edge of a canister to which an attachable lid can be added. The curled lip also rigidifies the top of the canister. If the apparatus is modified, it is also possible to pass the tube from the first stage apparatus of the invention through the lip forming stations of the second stage of the invention twice, each time forming a lip at one of the top or bottom edges of the tube. If this is done, an attachable lid can be added to both the top and bottom edges of the tube to complete the canister. The resulting canister would have both a removable top and a removable bottom, and there would be no need to weld on a canister base. To make such canisters, the tubes could be loaded at the tube placement station 860 and could proceed to the first lip-forming station 1200 without performing the canister base welding operation at the welding station 985. After the lip-forming operation is performed on the top edge of the tubes, the tubes could be taken from the operating platform 410 and loaded on the tube supply turntable 450 (by a robot arm or otherwise) with their top edges down so that a lip would be added to the bottom edges as they again proceed through the lip-forming stations. Top and bottom lids could then be added to the top and bottom of the doubly-lipped tubes to complete the canister.

Figure 46:
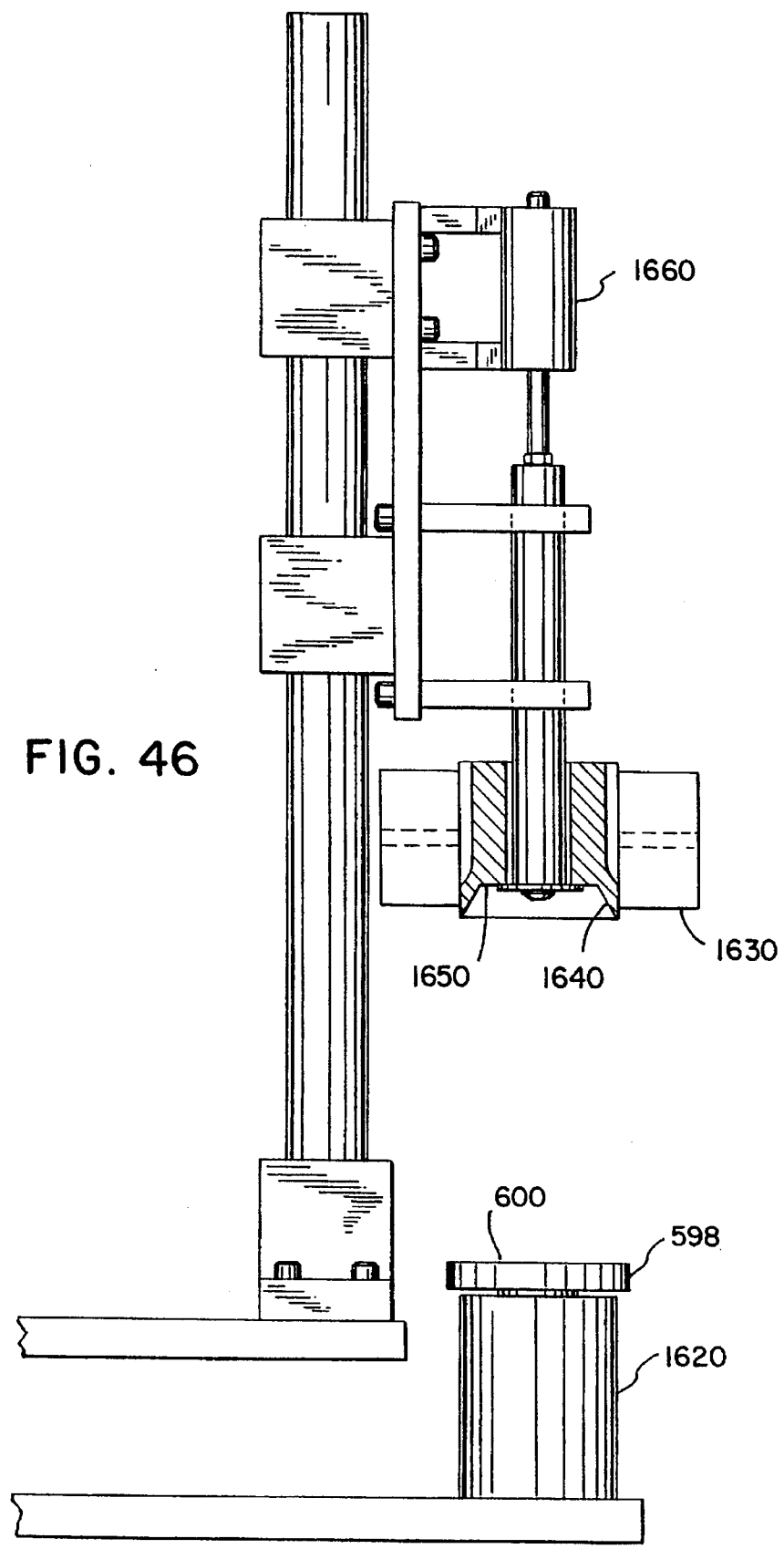
FIG. 46 is an elevation view of the tube rounding station.

After a lip is formed on the canister, the operating platform 410 carries the canister to the tube rounding station 1620, shown in FIG. 46. The tube rounding station 1620 utilizes a rounding plunger 1630 to force the top edge of the canister into round. This step may be necessary to produce a perfectly round canister because the top edge of the canister, which at this point is still soft as it cools from the lip-forming process, may begin to distort as different areas on the newly-formed lip cool faster than others. The rounding plunger 1630 has a frustoconical surface 1640 on its plunger face 1650. A rounding pneumatic cylinder 1660, e.g. a Little Giant R&E pneumatic cylinder, lowers the rounding plunger 1630 downwardly so that the frustoconical surface 1640 contacts the newly-formed lip at the top edge of the canister. The frustoconical surface 1640 acts as a funnel, forcing the still-soft top edge of the canister into a round configuration. The rounding plunger 1630 is made of aluminum so that it carries heat away from the lip, cooling it and fixing it in its round configuration. The tube rounding station 1620 may also include means for checking proper lip formation. One method of determining whether the lip formation is proper is to provide the frustoconical surface 1640 with an aperture through which air pressure can be simultaneously supplied and monitored. Since an improper, jagged lip will cause more air to escape from between the lip and the frustoconical surface 1640, a low back pressure reading indicates that the lip may be improperly formed. After the rounding plunger 1630 retreats, the operating platform 410 carries the canister to the primary unloading station 1790.

At the primary unloading station 1790, shown in FIG. 19, no forming operation is performed upon the canister. Removal of the canisters may be accomplished simply by using a protruding stationary pusher member 1800 as shown in FIG. 19 which strikes the canister and strips it off of the forming support 598 into a bin or a conveyor as the operating platform rotates. A secondary unloading station 1795 may be used to dislodge any canister bases that remain on a forming support 598 if a canister was not properly formed (e.g. a defective tube-to-base weld). A pressure supply 663 located under the secondary unloading station supplies a blast of air through the forming support 598, unseating any canister bases that may remain and ejecting them from the forming support 598. As a preferred alternative, an active unloader 1805 may be used as illustrated in FIG. 20. The active unloader 1805 has a main mounting plate 1806 which is mounted to the stationary platform 420 at a level above the tops of the canisters. A pneumatic drive cylinder 1808 is mounted to the plate 1806, and a semicircular pusher member 1810 is attached to the drive rod of the cylinder. The pneumatic cylinder 1808 is operated to advance the pusher from its position shown in FIG. 20 to a forward position to knock a canister at the position 1790 onto a conveyor 1815. A guide plate 1820 is also mounted to the mounting plate 1806 and extends out over the operating platform at a level just above the forming supports 598. An air tube shown in dashed lines at 1822 directs a blast of air at the top of the forming support 598 the position 1795 to help drive off a base left on the forming support, which is then directed with the help of the guide plate 1820 onto the conveyor 1815.

At this point, the canisters are completed. If the sidewall blanks 130 were pre-labeled, the canisters are ready for filling with the desired product. If a clear plastic was used for the sidewall blank 130 and the canister base material, the clarity of the canister should be equivalent to that of these components, save for some clouding at the welded regions of the tube seam and the tube-canister base seam. The labeling should not have suffered any distortion provided it did not overlap the welded areas. After filling, a preformed canister lid may be "snapped" over the top lip, if a top lip was formed.

Figure 47:
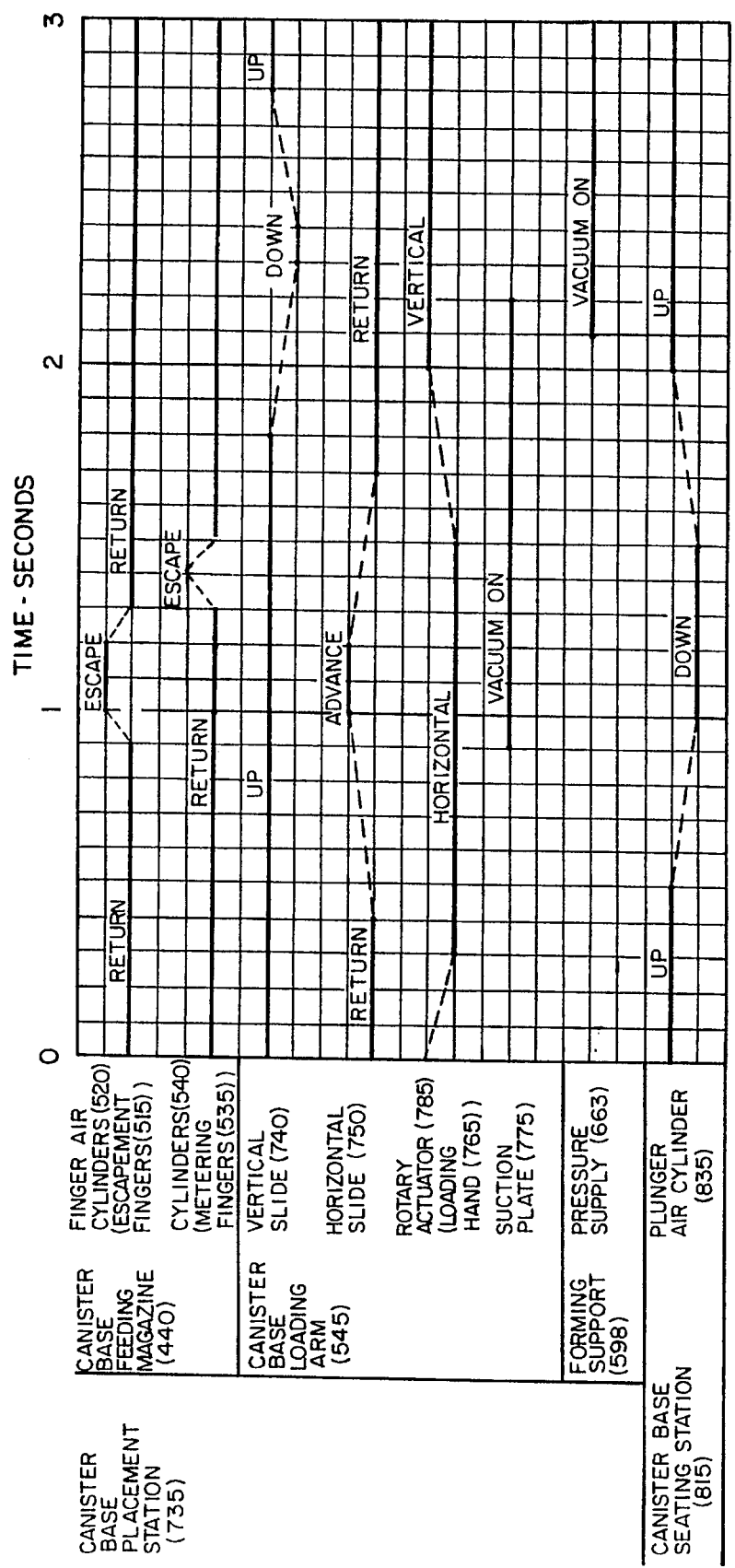
FIG. 47 is a timing diagram showing the timing of mechanisms used at the canister base placement station and the canister base seating station.
Figure 48:
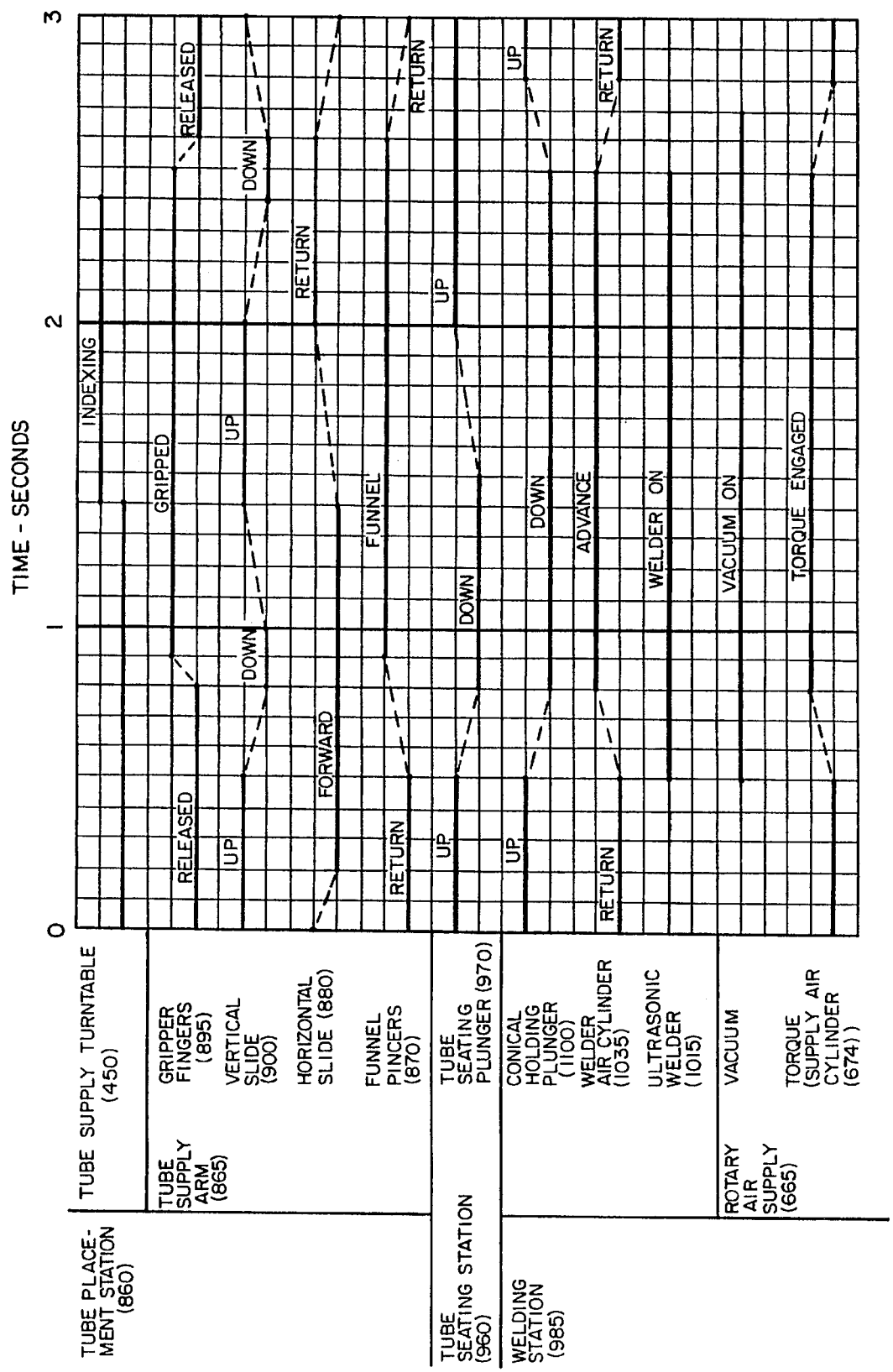
FIG. 48 is a timing diagram showing the timing of mechanisms used at the tube placement station, the tube seating station, and the welding station.
Figure 49:
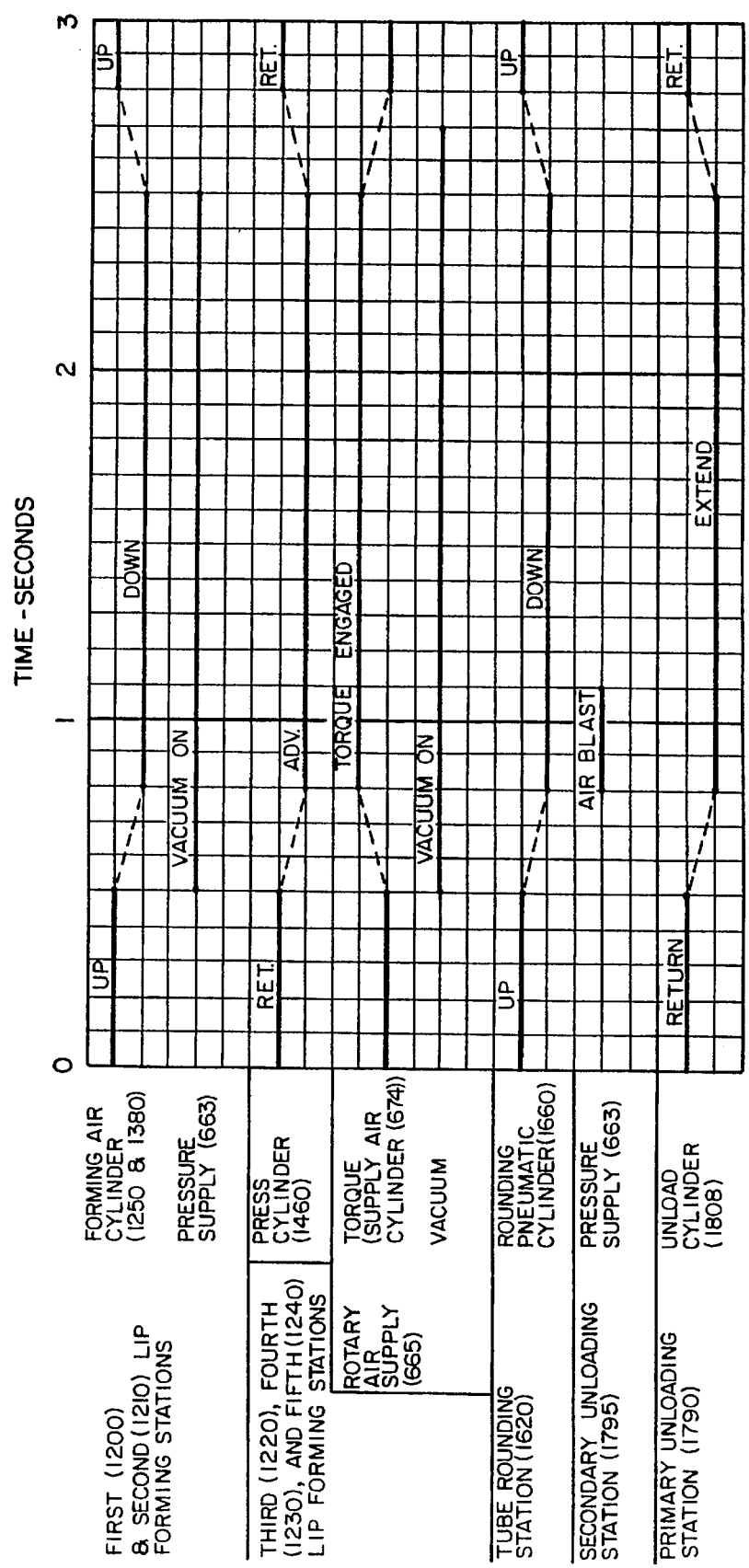
FIG. 49 is a timing diagram showing the timing of mechanisms used at the lip forming stations, the tube rounding station, and the secondary unloading station.

FIGS. 47–49 show timing diagrams for the various mechanisms used in the second stage apparatus of the invention, illustrating the simultaneous operation of the various mechanisms used to form a canister from the tube. The timing of the mechanisms in the second stage, as well as in the first stage, may be accomplished by an appropriate sequential controller (e.g., an Allen-Bradley SLC-500 Programmable Controller). All of FIGS. 47–49 depict the same operating interval, with the mechanisms at all forming stations performing their operations over this time span (e.g. 3 seconds). When this operating interval is completed, the operating platform 410 rotates to carry each forming platform 565, and therefore the canister atop it, to the next forming station. FIG. 47 illustrates the timing of the mechanisms used at the canister base placement station 735 and the canister base seating station 815. The timing diagrams for the canister base placement station 735 include the timing for both the finger air cylinders 520 (which actuate the escapement fingers 515) and the air spring cylinders 540 (which actuate the metering fingers 535) of the canister base feeding magazine 440; the vertical slide 740, horizontal slide 750, rotary actuator 785 (which actuates the loading hand 765), and suction plate 774 of the canister base loading arm 545; and the pressure supply 663 (which supplies vacuum to the forming support 598). The timing diagram for the canister base seating station 815 illustrates the timing for the plunger air cylinder 835, which actuates the base seating plunger 820. FIG. 48 illustrates the timing of the mechanisms used at the tube placement station 860, the tube seating station 960, and the welding station 985. The timing diagrams for the tube placement station 860 include the timing of the tube supply turntable 450 and the various mechanisms of the tube supply arm 865: the gripper fingers 895, vertical slide 900, horizontal slide 880, and the pneumatic rotary actuator 915 of the funnel pincers 870. The timing diagram for the tube seating station 960 illustrates the timing of the air cylinder that actuates the tube seating plunger 970. The diagrams for the welding station 985 include the timing of the conical holding plunger 1100, the welder air cylinder 1035 (which brings the welding head 1030 into place adjacent to the canister base), and the ultrasonic welder 1015, as well as the timing for the rotary air supply 665 (including both the vacuum supply and the actuation of the supply air cylinder 674 to supply torque). FIG. 49 illustrates the timing of the mechanisms used at the first and second tube forming stations 1200 and 1210, the third, fourth, and fifth tube forming stations 1220, 1230, and 1240, the tube rounding station 1620, and the secondary unloading station 1795. Because the timing of the mechanisms used at the first and second tube forming stations 1200 and 1210 is identical, a single timing diagram is shown for both stations, showing the timing for both of the first and second forming air cylinders 1250 and 1380 (which actuate the first and second heated plungers 1280 and 1370) and the individual pressure supplies 663 used at the stations. The timing of the mechanisms used at the third, fourth, and fifth tube forming stations 1220, 1230, and 1240 are likewise identical, and the timing of the press cylinders 1460 (which actuate the third, fourth, and fifth heated plungers 1390, 1540, and 1550) and the rotary air supplies 665 (which supply torque and vacuum to the forming supports 598 at each of these stations) is illustrated. The timing diagram for the tube rounding station 1620 depicts the timing for the rounding pneumatic cylinder 1660, which actuates the rounding plunger 1630. The timing diagram for the secondary unloading station 1795 illustrates the timing of the air blast delivered to the forming surface 600 by the pressure supply 663.

It is understood that the invention is not confined to the particular construction and arrangement of parts herein illustrated and described, but embraces such modified forms thereof as come within the scope of the following claims.

What is claimed is:

1. Apparatus for forming successive canisters from successively supplied sidewall blanks, each such sidewall blank having an inner face and an outer face opposite from the inner face and separated from the inner face by opposite side edges and a top and bottom edge, and from successively supplied canister bases, each such canister base having a disk surface with a disk periphery from which descends a depending skirt, comprising:

(a) a pair of sidewall blank support surfaces, each having a top side and an adjacent inner side, with the inner sides facing each other and separated by a ram gap;

(b) sidewall placement means for placing successive sidewall blanks upon the top sides of the sidewall blank support surfaces, with the outer face of each sidewall blank in contact with the top sides of the sidewall blank support surfaces;

(c) ram means for forcing each successive sidewall blank which rests upon the sidewall blank support surfaces into a U-shaped configuration by translating the sidewall blank between the sidewall blank support surfaces and into the ram gap;

(d) holding means located on the sidewall blank support surfaces for catching the side edges of each successive sidewall blank and fixing the sidewall blank in its U-shaped configuration;

(e) support means, having a surface, for supporting the side edges of each successive sidewall blank upon the surface of the support means in overlapping fashion;

(f) clamping means for pushing the side edges of each successive sidewall blank against the surface of the support means, with one side edge overlapping the other;

(g) tube welding means for welding the overlapping side edges of each successive sidewall blank together, thereby forming a tube having an inner cavity bounded by a sidewall with a top edge and a bottom edge;

(h) at least one forming surface upon which a canister base may be placed;

(i) canister base placement means for placing each successive canister base atop an individual forming surface;

(j) tube placement means for placing successive tubes each atop a canister base which has been placed on a forming surface so that the inner cavity of the tube rests over the disk surface and the bottom edge of the tube rests in close relation to the skirt; and (k) canister welding means for welding together the bottom edge of each successive tube and each successive canister base which rest on a forming surface, thereby forming a canister with a substantially tubular sidewall, which extends from a top canister edge to a bottom canister edge, and a bottom canister base which is attached to the bottom canister base in an orientation substantially perpendicular to the tubular sidewall, with the tubular sidewall and the bottom canister base bounding an inner cavity.

2. The apparatus of claim 1 further including lip forming means for forming a lip at the top canister edge.

3. The apparatus of claim 2 further including lip checking means for indicating whether the lip has been formed evenly across the circumference of the canister.

4. The apparatus of claim 2 wherein the lip forming means comprises:

heating means for softening the top canister edge; and plunger means for softening the top canister edge and bending the top canister edge radially outward from the inner cavity of the canister.

5. The apparatus of claim 4 wherein the heating means and the plunger means are unitary.

6. The apparatus of claim 4 wherein the heating means comprises at least one heated plunger which moves into contact with the top canister edge and applies heat to the top canister edge.

7. The apparatus of claim 4 wherein the plunger means comprises at least one movable plunger having a face surface, with the face surface including a raised shoulder which has substantially the same diameter as the canister and which is bounded by a beveled surface, such that when the top canister edge is softened and the face surface is forced onto the top canister edge, the raised shoulder enters the inner cavity of the canister and the beveled surface contacts and bends the top canister edge radially outward from the tubular sidewall.

8. The apparatus of claim 4 wherein the plunger means comprises at least one movable plunger having a face surface which includes a forming groove with substantially the same diameter as the canister, such that when the top canister edge is softened and inserted within the groove and the plunger is forced onto the top canister edge, the top canister edge bends in the direction of plunger motion.

9. The apparatus of claim 1 including canister removal means for removing the canister from the forming surface.

10. The apparatus of claim 1 including canister base alignment means for aligning the canister base on the forming surface so that its disk surface lays atop and parallel to the forming surface.

11. The apparatus of claim 10 wherein the canister base alignment means comprises at least one movable base seating plunger with a plunger surface which contacts and pushes the canister base.

12. The apparatus of claim 1 including canister base checking means for indicating whether a canister base is located on the forming surface.

13. The apparatus of claim 1 wherein the tube placement means include tube seating means for aligning each tube atop each canister base on a forming surface so that the inner cavity of each tube so aligned rests over the disk surface of the canister base beneath it and the bottom edge of the tube rests in close relation to the skirt.

14. The apparatus of claim 13 wherein the tube seating means include funnel means for positioning the sidewalls of each tube into a relation with the canister base on the forming surface beneath the tube such that the inner cavity of each tube so positioned rests over the disk surface of the canister base.

15. The apparatus of claim 14 wherein the funnel means comprise funnel pincers which include two opposable jaws capable of moving between an open position and a closed position, each jaw having an upper surface and also an inner surface which lays parallel and adjacent to the inner surface of the other jaw when the jaws lay in the closed position, and each jaw having a concave aperture on its inner surface which lays parallel and adjacent to the concave aperture of the other jaw when the jaws lay in the closed position, such that when the jaws are moved into their closed position, the concave apertures meet to form a central aperture between the jaws wherein the tube can be inserted so that it is directed onto the area below the central aperture.

16. The apparatus of claim 13 wherein the tube seating means include a movable tube seating plunger which presses the top edge of each tube resting atop a canister base on a forming surface so that the canister base rests with the skirt of the canister base in close relation to the bottom edge of the tube, and with the disk surface of the canister base parallel to the bottom edge of the tube.

17. The apparatus of claim 1 wherein the tube placement means include tube checking means for indicating whether a tube is present atop the canister base on the forming surface.

18. A method of successively forming canisters from successively supplied sidewall blanks, with each such sidewall blank including an inner face and an outer face opposite from the inner face and separated from the inner face by opposite side edges and a top and bottom edge, and from successively supplied canister bases, with each such canister base having a disk surface with a disk periphery and a central axis and a depending skirt descending from the disk periphery, comprising the steps of:

(a) locating each successive sidewall blank so that its outer face rests upon a pair of sidewall blank support surfaces, each of which have upper sides and inner sides, which inner sides face each other and are separated by a ram gap;

(b) forcing each successive sidewall blank into the ram gap and into a U-shaped configuration by the use of ram means;

(c) catching the side edges of each successive sidewall blank after it has entered the ram gap and fixing it in its U-shaped configuration by the use of holding means;

(d) positioning a mandrel having a surface within the U-shaped configuration of each successive sidewall blank;

(e) pushing the side edges of each successive U-shaped sidewall blank towards the mandrel until one side edge contacts the surface of the mandrel and the other side edge overlaps the side edge contacting the surface of the mandrel;

(f) attaching the overlapping side edges of each successive sidewall blank together, thereby forming a tube having an inner cavity bounded by a sidewall with a top edge and a bottom edge;

(g) placing successive individual canister bases upon a forming surface;

(h) placing each tube in succession atop a canister base which rests on a forming surface so that the skirt of the canister base rests in close relation to the bottom edge of the tube; and (i) welding the bottom edge of each successive tube to the canister base upon which the tube rests, thereby completing the canister.

19. The method of claim 18 including the step of forming a lip at the top edge of each successive canister by the use of lip forming means.

20. The method of claim 18 including the step of unloading each successive canister from the forming platform by the use of unloading means.

21. The method of claim 18 including the step of aligning each successive tube on a canister base which rests atop a forming surface so that the canister base rests with the skirt of the canister base in close relation to the bottom edge of the tube.

22. The method of claim 18 wherein the step of attaching the skirt to the bottom edge of the tube is performed by positioning the forming surface, with the tube and canister base atop it, adjacent to canister welding means and then rotating the forming surface about its central axis at least one full revolution as the canister welding means simultaneously apply welding forces to the tube and canister base.

23. The method of claim 22 wherein the welding forces are applied to the tube and canister base in a direction parallel to the plane of the disk surface and also parallel to, but not coincident with, a radius of the disk surface defined by a line in the plane of the disk surface extending from the central axis of the disk surface to the periphery of the disk surface.

24. Apparatus for forming successive tubes from successively supplied sidewall blanks, each having an inner face and an outer face opposite from the inner face and separated from the inner face by opposite side edges and a top and bottom edge, comprising:

(a) a pair of sidewall blank support surfaces, each having a top side and an adjacent inner side, with the inner sides facing each other and separated by a ram gap;

(b) sidewall placement means for successively placing individual sidewall blanks upon the top sides of the sidewall blank support surfaces, with the outer face of each sidewall blank in contact with the top sides of the sidewall blank support surfaces;

(c) shaping means for successively forcing each sidewall blank which rests upon the sidewall blank support surfaces into a U-shaped configuration wherein the side edges rest on the sidewall blank support surfaces and a major portion of the sidewall blank rests within the ram gap;

(d) support means, having a length and a surface, for supporting the side edges of each successive sidewall blank along its length upon the surface of the support means;

(e) clamping means for pushing the side edges of each successive sidewall blank against the surface of the support means, with one side edge overlapping the other; and (f) tube welding means for attaching the overlapping side edges of each successive sidewall blank together, thereby forming a tube having an inner cavity bounded by a sidewall with a top edge and a bottom edge.

25. The apparatus of claim 24 in combination with holding means for catching the side edges of each successive sidewall blank on the sidewall blank support surfaces and fixing the sidewall blank in its U-shaped configuration.

26. The apparatus of claim 25 wherein the holding means comprises a groove located on each feed rail and pushing means which push each side edge of the sidewall blank into a groove.

27. The apparatus of claim 26 wherein the pushing means comprises a channel floor resting beneath the sidewall blank support surfaces, the channel floor springably supported so that it will retreat from the sidewall blank support surfaces when the ram means force a sidewall blank against it and approach the sidewall blank support surfaces when the ram means withdraw from the ram gap.

28. The apparatus of claim 24 including a sidewall magazine with a top surface and a bottom surface and a rectangular loading aperture extending from the top surface to the bottom surface, such that a sidewall blank resting on the top surface may be pulled through the loading aperture when a pulling force is exerted on the sidewall blank through the loading aperture.

29. The apparatus of claim 24 wherein the shaping means comprises a ram whose path of travel intersects the plane of the sidewall blank and extends between the sidewall blank support surfaces and into the ram gap.

30. The apparatus of claim 24 wherein the support means comprises a substantially cylindrical mandrel.

31. The apparatus of claim 24 wherein the support means is attached to a rotary hub which has a central axis of revolution so that the length of the support means extends from the rotary hub in radial fashion.

32. The apparatus of claim 24 wherein the support means includes a welding strip extending down at least part of its length at the point on its surface where the side edges of the sidewall blank overlap when they are pushed against the support means by the clamping means.

33. The apparatus of claim 32 wherein at least part of the welding strip is knurled.

34. The apparatus of claim 24 wherein the clamping means comprises a pair of movable clamping jaws which may move between an open position and a closed position, with each clamping jaw having a length ending in a set of fingers, with each set of fingers having a shape such that, when the clamping jaws are in the closed position with the support means resting between the clamping jaws, each set of fingers rests parallel to and in close relation to the surface of the support means.

35. The apparatus of claim 24 wherein the tube welding means comprises at least one ultrasonic welder.

36. The apparatus of claim 24 wherein the tube welding means comprises at least one welder which welds the side edges of the sidewall blank by applying heat and pressure to the side edges of the sidewall blank.

37. The apparatus of claim 24 including tube removal means for removing the tube from the support means.

38. The apparatus of claim 24 wherein the sidewall placement means operate simultaneously with the ram means so that at the same time that the ram means operates to force a sidewall blank into a U-shaped configuration, the sidewall placement means operates to place a successive sidewall blank upon the sidewall blank support surfaces.

* * * * *